(12) United States Patent
Malhotra et al.

(10) Patent No.: US 11,537,977 B1
(45) Date of Patent: Dec. 27, 2022

(54) METHOD AND SYSTEM FOR OPTIMIZING DELIVERY OF CONSIGNMENTS

(71) Applicant: PANDOCORP PRIVATE LIMITED, Chennai (IN)

(72) Inventors: Siddhant Malhotra, New Delhi (IN); Abhijeet Manohar, Bangalore (IN); Krishanu Seal, Bangalore (IN)

(73) Assignee: Pandocorp Private Limited, Chennai (IN)

( * ) Notice: Subject to any disclaimer, the term of this patent is extended or adjusted under 35 U.S.C. 154(b) by 0 days.

(21) Appl. No.: 17/673,761

(22) Filed: Feb. 16, 2022

(51) Int. Cl.
*G06Q 10/08* (2012.01)

(52) U.S. Cl.
CPC ............................. *G06Q 10/08355* (2013.01)

(58) Field of Classification Search
None
See application file for complete search history.

(56) References Cited

U.S. PATENT DOCUMENTS

| | | | |
|---|---|---|---|
| 2016/0300186 A1* | 10/2016 | Scharaswak | G06Q 10/0835 |
| 2020/0338602 A1* | 10/2020 | Mo | B65G 67/20 |
| 2022/0026222 A1* | 1/2022 | Tian | G01C 21/3453 |
| 2022/0108213 A1* | 4/2022 | Cao | G06N 20/00 |
| 2022/0129840 A1* | 4/2022 | Negi | G06K 9/6256 |

FOREIGN PATENT DOCUMENTS

| | | | | |
|---|---|---|---|---|
| GB | 2450305 A | * | 12/2008 | ............ G06Q 10/08 |
| WO | WO-2013072729 A1 | * | 5/2013 | ........... G06Q 10/047 |

OTHER PUBLICATIONS

Fada, Edoardo; "Mixing Machine Learning and Optimization for the Tactical Capacity Planning in Last-Mile Delivery"; Jul. 1, 2021; IEEE (COMPSAC)' pp. 1291-1296 (Year: 2021).*

* cited by examiner

*Primary Examiner* — Michael P Harrington
*Assistant Examiner* — Jorge G Del Toro-Ortega
(74) *Attorney, Agent, or Firm* — Kanika Radhakrishnan; Evergreen Valley Law Group

(57) ABSTRACT

A method (800) and system (150) for optimizing delivery of consignments is disclosed. Real-order data for delivering a consignment including a plurality of packages is received. The real-order data includes package related information and vehicle related information, which are pre-processed to generate a plurality of inputs. A machine learning model (164) trained using DRL is selected to optimize an objective function of minimizing an overall cost of consignment delivery by optimizing a number of vehicles selected for consignment delivery and optimizing a number of consignees and a number of drop locations serviced by each selected vehicle. The plurality of inputs is provided to the machine learning model (164) to predict a sequence of loading actions in relation to loading of the plurality of packages in the vehicles. A loading plan (504) is generated based on the sequence of loading actions. The loading plan (504) optimizes the delivery of the plurality of packages associated with the consignment.

19 Claims, 7 Drawing Sheets

| 8.0 | 3.0 | 3.0 | 3.0 | 0.0 | 0.0 | 0.0 | 0.0 | 0.0 | 0.0 |
|---|---|---|---|---|---|---|---|---|---|
| 8.0 | 3.0 | 3.0 | 3.0 | 0.0 | 0.0 | 0.0 | 0.0 | 0.0 | 0.0 |
| 8.0 | 3.0 | 3.0 | 3.0 | 0.0 | 0.0 | 0.0 | 0.0 | 0.0 | 0.0 |
| 8.0 | 3.0 | 3.0 | 3.0 | 0.0 | 0.0 | 0.0 | 0.0 | 0.0 | 0.0 |
| 8.0 | 3.0 | 3.0 | 3.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 |

METHOD AND SYSTEM FOR OPTIMIZING DELIVERY OF CONSIGNMENTS

TECHNICAL FIELD

The present disclosure generally relates to tools used in planning delivery of consignments to a number of consignees and, more particularly, to a method and system for optimizing the delivery of consignments to the intended consignees.

BACKGROUND

Efficiently delivering goods to intended recipients is a longstanding problem and a large body of research has been dedicated to deriving algorithms that aim at identifying ways to achieve the objective of delivering goods to intended recipients in an optimum manner.

In one illustrative example, the objective is framed as a traveling salesman problem or TSP, which aims to find, given a set of cities and distance between every pair of cities, the shortest possible route that visits every city exactly once and returns to the starting point. A generalized form of the TSP is the Vehicle Routing Problem or VRP, which aims to minimize a total travel distance, when visiting a number of locations with a fixed number of vehicles. A capacitated vehicle routing problem (CVRP) is a type of VRP in which vehicles with limited carrying capacity need to pick up or deliver items at various locations for the least cost, while never exceeding the capacity of the vehicles. In addition to the attempts for achieving the aforementioned objective, several vehicle bin packing algorithms have also been proposed for efficiently packing items in vehicles to achieve the objective of delivering goods to intended recipients in an optimum manner.

However, the bin packing problem and the vehicle routing problem such as CVRP, are solved as separate problems as both of these problems are complex non-deterministic polynomial-time (NP) hard problems. More specifically, these problems are essentially combinatorial optimization problems with a large search space stemming from many possible combinations between the input and output variables, subject to the constraints. As a result, most attempts at optimizing delivery of consignments have focused on solving the bin packing problem and the vehicle routing problem separately. However, treating consignment packing and consignment delivery as two different problems leads to suboptimal solutions as delivery routes depend on packed consignments in the delivery vehicles. Typically, heuristic algorithms are utilized to solve combinatorial optimization problems. One key limitation of using heuristic algorithms is that the algorithms need to be completely redesigned for even the smallest change in the environment (package size, shape, vehicle capacity, change in cost, etc.). As such, the use of heuristic solutions is inflexible and cumbersome to use for solving combinatorial optimization problems with a large search space.

Accordingly, there is a need for overcoming the drawbacks of conventional solutions and providing ways to optimize delivery of consignments to intended consignees. Further, it would be advantageous to solve the CVRP and the bin packing problem without involving heuristics to accommodate any change in consignment delivery that may be introduced later and ensure maximum capacity utilization of the vehicles while adhering to service levels.

SUMMARY

In an embodiment of the invention, a computer-implemented method for optimizing delivery of consignments is disclosed. The method receives, by a system, real-order data in relation to delivering a consignment including a plurality of packages. The plurality of packages is to be delivered from at least one pickup location to a plurality of drop locations associated with a plurality of consignees. The real-order data includes package related information corresponding to the plurality of packages and vehicle related information corresponding to a plurality of vehicles available for delivering the consignment. The method preprocesses, by the system, the package related information and the vehicle related information in the real-order data to generate a plurality of inputs. The method selects, by the system, a machine learning model trained using deep reinforcement learning (DRL) to optimize an objective function of minimizing an overall cost of consignment delivery. Minimizing the overall cost includes optimizing a number of vehicles selected for the consignment delivery based on an evaluation of a three-dimensional (3D) fitment of each package in loading bins associated with selected vehicles subject to a plurality of constraints associated with the consignment delivery. Minimizing the overall cost further includes optimizing a number of consignees and a number of drop locations serviced by each selected vehicle. The method provides, by the system, the plurality of inputs to the machine learning model, wherein the machine learning model is configured to predict a sequence of loading actions in relation to loading of the plurality of packages in the selected vehicles, wherein each loading action corresponds to placement of a selected package in a selected position in a loading bin of a selected vehicle from among the selected vehicles. The method generates, by the system, a loading plan based on the predicted sequence of loading actions, wherein the loading plan is configured to optimize the delivery of the plurality of packages associated with the consignment.

In an embodiment of the invention, a system for optimizing delivery of consignments is disclosed. The system includes a processor and a memory. The memory stores instructions. The processor is configured to execute the instructions and thereby cause the system to at least receive real-order data in relation to delivering a consignment including a plurality of packages. The plurality of packages is to be delivered from at least one pickup location to a plurality of drop locations associated with a plurality of consignees. The real-order data includes package related information corresponding to the plurality of packages and vehicle related information corresponding to a plurality of vehicles available for delivering the consignment. The system pre-processes the package related information and the vehicle related information in the real-order data to generate a plurality of inputs. The system selects a machine learning model trained using deep reinforcement learning (DRL) to optimize an objective function of minimizing an overall cost of consignment delivery. Minimizing the overall cost includes optimizing a number of vehicles selected for the consignment delivery based on an evaluation of a three-dimensional (3D) fitment of each package in loading bins associated with selected vehicles subject to a plurality of constraints associated with the consignment delivery. Minimizing the overall cost further includes minimizing a number of consignees and a number of drop locations serviced by each selected vehicle. The system provides the plurality of inputs to the machine learning model, wherein the machine learning model is configured to predict a sequence of loading actions in relation to loading of the plurality of packages in the selected vehicles, wherein each loading action corresponds to placement of a selected package in a selected position in a loading bin of a selected vehicle from among the selected vehicles. The system generates a loading plan based on the predicted sequence of loading actions. The loading plan is configured to optimize the delivery of the plurality of packages associated with the consignment.

In an embodiment of the invention, another computer-implemented method for optimizing delivery of consignments is disclosed. The method receives, by a system, real-order data in relation to delivering a consignment including a plurality of packages. The plurality of packages is to be delivered from at least one pickup location to a plurality of drop locations associated with a plurality of consignees. The real-order data includes package related information corresponding to the plurality of packages and vehicle related information corresponding to a plurality of vehicles available for delivering the consignment. The method pre-processes, by the system, the package related information and the vehicle related information in the real-order data to generate a plurality of inputs. The method selects, by the system, a machine learning model trained to use deep reinforcement learning (DRL) for optimizing packing of the plurality of packages in an optimum number of vehicles selected from among the plurality of vehicles. The packing of the plurality of packages in the selected vehicles is performed subject to a plurality of constraints and subject to optimizing a number of consignees and a number of drop locations serviced by each selected vehicle. The method provides, by the system, the plurality of inputs to the machine learning model. The machine learning model is configured to predict a sequence of loading actions in relation to loading of the plurality of packages in the selected vehicles, wherein each loading action corresponds to placement of a selected package in a selected position in a loading bin of a selected vehicle from among the selected vehicles. The method generates, by the system, a loading plan based on the predicted sequence of loading actions, wherein the loading plan is configured to optimize the delivery of the plurality of packages associated with the consignment.

DETAILED DESCRIPTION

Figure 1:
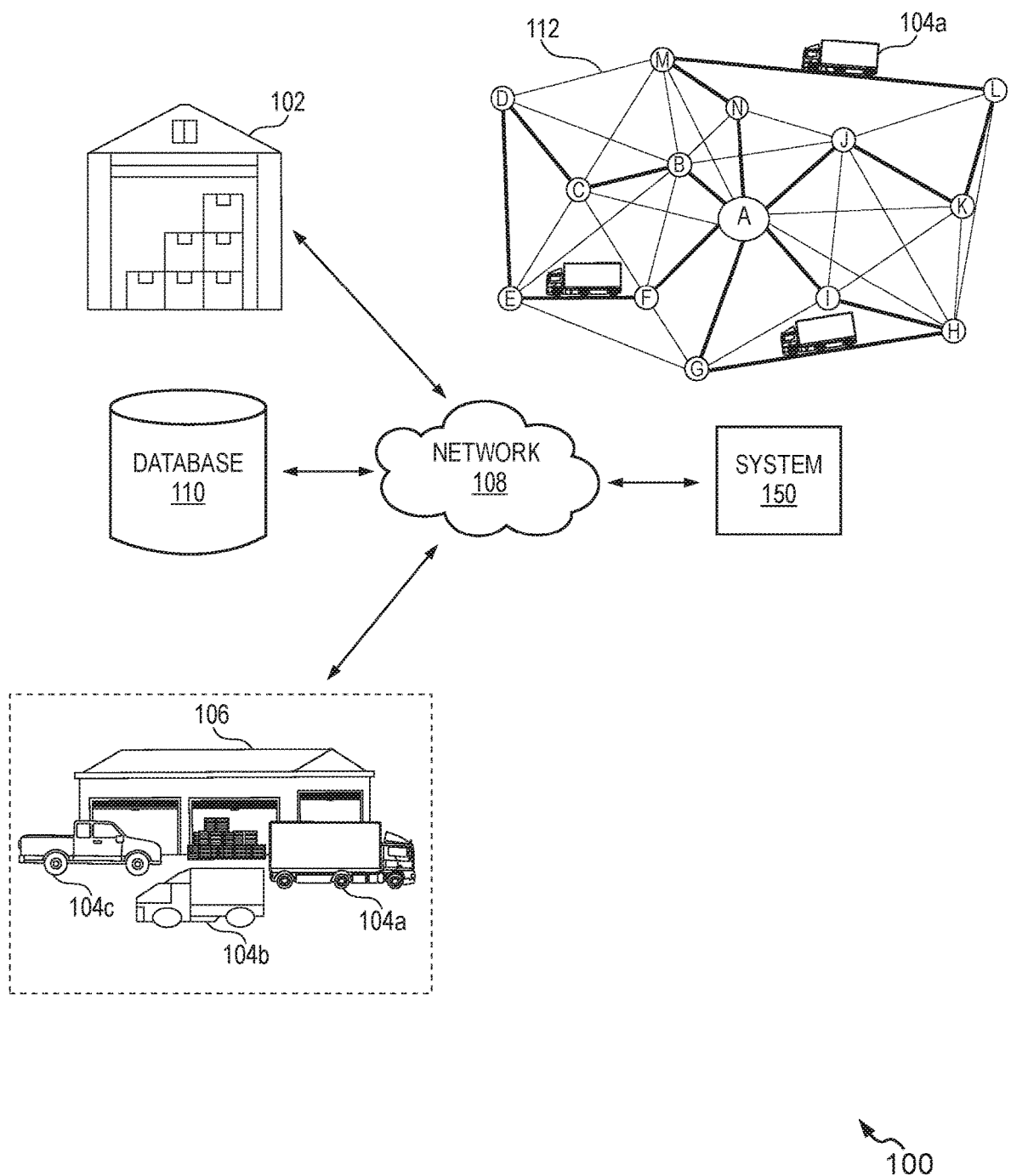
FIG. 1 illustrates an exemplary representation of an environment related to at least some example embodiments of the present invention.

The detailed description provided below in connection with the appended drawings is intended as a description of the present examples and is not intended to represent the only forms in which the present example may be constructed or utilized. However, the same or equivalent functions and sequences may be accomplished by different examples.

Overview

Capacitated vehicle routing problem (CVRP) and bin-packing problem are two formulations of an objective of minimizing cost of delivering consignments to intended consignees. However, these problems are solved separately as each problem is a complex Non-deterministic Polynomial-Time (NP) hard problem. A search space due to possible combinations between the input and output variables substantially increases when these combinatorial optimization problems are combined and as such, only heuristic solutions are attempted to solve these problems. One key limitation of using heuristic algorithms is that the algorithms need to be completely redesigned for even the smallest change in the environment (package size, shape, vehicle capacity, change in cost, etc.), which makes it a less attractive solution for solving the combined CVRP and bin packing problem.

The present invention proposes to solve the CVRP as a three-dimensional (3D) bin packing problem by taking into consideration various constraints present in the CVRP. An expression of the CVRP as a 3D bin packing problem as proposed herein is shown in Equation (1) below:

$$\text{delivery\_charge} = \text{vehicle\_charge} + (\text{num\_cons} - 1) * \text{drop\_charge} \quad \text{Eqn. (1)}$$

wherein delivery_charge is a cost of delivering packages of a consignment by a single selected vehicle from among the vehicles selected for consignment delivery, vehicle_charge is a fixed charge associated with the selected vehicle, num_cons is a number of consignees that the selected vehicle will deliver to, and drop_charge is a fixed drop-off charge for each delivery at a drop location for the selected vehicle. The overall cost of delivering the consignments is a sum of delivery charges of each vehicle from among the vehicles selected for delivering the packages of the consignment.

The formulation of the CVRP problem as the 3D bin packing problem as shown in Eqn. (1) enables minimizing the overall cost of delivering the packages of the consignment to a plurality of consignees. Minimizing the overall cost may entail optimizing a number of vehicles selected for consignment delivery based on an evaluation of a three-dimensional (3D) fitment of each package in loading bins associated with selected vehicles subject to a plurality of constraints associated with the consignment delivery. It is noted that optimizing the number of the vehicles may not always imply reducing the number of vehicles selected for consignment delivery. For example, if vehicles of smaller sizes are more suited for consignment delivery, then even though the number of vehicles selected is higher, the overall cost with respect to the parameter vehicle_charge is optimized as the associated fixed charge (i.e., the parameter vehicle_charge) may be smaller for each smaller vehicle than the vehicle_charge of a larger vehicle. In an illustrative example, if the 3D fitment of packages in loading bins may occupy a full loading bin of a large truck and a partial loading bin of another large truck, then three smaller trucks, whose loading bins fit the 3D fitment of packages in the delivery consignment may be chosen. In such a case, the vehicle_charge of employing three smaller trucks may be smaller than (or equal to) the vehicle_charge of employing two large trucks. Thus, optimizing the vehicle_charge parameter may entail optimizing the number of vehicles involved in consignment delivery by efficiently packing the loading spaces in the vehicles while taking into account the 3D-fitment of individual packages and stacking/loading constraints. In effect, optimizing the vehicle_charge parameter may involve solving the 3D-bin packing problem.

Further, it is noted that the overall cost of delivering the packages of the consignment may reduce when delivery charge of individual vehicles (i.e. delivery_charge) is reduced. The delivery charge of individual vehicles may reduce when the parameter '(num_cons−1)*drop_charge' reduces, which in turn, may entail reducing the number of consignees that the selected vehicle delivers to, and number of drop locations serviced by the selected vehicle. In effect, optimizing (i.e. minimizing) the '(num_cons−1) *drop_charge' parameter may involve selecting an optimum route to deliver packages subject to loading and consignee/ consignment constraints, thereby solving the CVRP.

To summarize, optimizing the delivery_charge in Eqn. (1) results in addressing both 3D-bin packing and CVRP to achieve optimum (i.e. minimum) cost of delivering packages associated with the consignment. It is noted that the CVRP and the bin packing problem are solved without involving heuristics and the solution is capable of accommodating any change in consignment delivery that may be introduced later and ensure maximum capacity utilization of the vehicles while adhering to service levels.

Further, the present invention proposes to use a deep reinforcement learning (DRL) based machine learning (ML) model to learn correlations between different package dimensions and changing bin sizes as the packages are loaded in the bins (i.e. the loading spaces in the trucks) to achieve the objective, i.e. to minimize the overall cost of delivering the packages of the consignment. The learnt correlations are not only limited to geometrical or spatial correlations, but the DRL based ML model is also trained to take temporal correlations into consideration while aiming to achieve the objective of minimizing the overall delivery cost. More specifically, in addition to finding the optimal placement of packages in available loading bins, the DRL based ML model also identifies the optimal sequence of loading packages related to the consignment to maximize packing efficiency while minimizing the overall cost of delivering the consignments. The various embodiments of the present invention are explained next with reference to FIGS. 1 to 8.

FIG. 1 illustrates an exemplary representation of an environment 100 related to at least some example embodiments of the present invention.

The environment 100 depicts a warehouse 102 owned by an organization (e.g., a manufacturer, an exporter, a retailer, an importer or, in general, a consignor) for stocking goods before they are sold or distributed. The warehouse 102 may be located in an industrial area, a factory area and the like. In at least some embodiments, the warehouse 102 may store several consignments or batches of goods to be transported to one or more customers (e.g., consignees) by using a plurality of vehicles such as vehicles 104a, 104b and 104c. Each consignment may include one or more packages including goods to be delivered to their intended consignees. It is noted that the term 'consignee' as used herein refers to a recipient of at least one package being delivered by a consignor. For example, the consignee may refer to a customer or a client who may be an authorized person to receive the package. For the sake of clarity, only one warehouse 102 is shown in FIG. 1. However, it should be noted that, in some example embodiments, there may be more than one warehouse and transportation may involve picking up packages related to a consignment from a plurality of warehouses and dropping off the packages at multiple consignee locations (also referred to herein as 'drop locations'). It is further understood that the packages may include a variety of goods such as but not limited to electronic devices, mechanical equipment, books, food items, gift items, raw materials, spare parts related to vehicles or finished goods related to agriculture, textile, manufacturing, and production. Further, it is noted that a location of pickup of packages, such as warehouse 102, is hereinafter interchangeably referred to as a source location or a pickup location, whereas a location of dropping off of the packages (i.e., locations associated with the consignees) is hereinafter interchangeably referred to as a destination location or a drop location.

The vehicles 104a, 104b, and 104c exemplarily shown in FIG. 1, may be employed by a fleet management entity 106 for facilitating distribution of goods in a supply chain, for example from the warehouse 102 to a consignee location, such as a retail store, for example. The vehicles tasked with ferrying delivery packages related to the consignments from one or more pickup locations (such as the warehouse 102) to consignees at different drop locations are interchangeably referred to as 'delivery vehicles', 'freight vehicles' or simply as 'vehicles'. It is noted that the fleet management entity 106 may include several vehicles such as the vehicles 104a, 104b, and 104c of different structure, capacity and dimensions for transporting cargo with different material characteristics. Some examples of the vehicles 104a, 104b, and 104c include semi-trailer truck, jumbo trailer truck, tail-lift truck, straight truck, and the like.

In an example scenario, a consignor, for example an owner of the warehouse 102, may request services of the fleet management entity 106 to deliver one or more packages to different consignee locations. The consignor may provide order related information, for example, number of consignees, package information related to each consignee, one or more constraints such as package stacking constraints, etc. to the fleet management entity 106. The information related to individual packages may include information, such as dimensions of each package (such as for example volume of a delivery package), weight of each delivery package, package content, and the like. In at least one embodiment, package related information such as package dimensions, weight of the package, etc., may be captured using sensors installed at various locations of consignor location, such as the warehouse 102. Alternatively, such information may also be captured by sensors deployed at a facility associated with the fleet management entity 106.

Further, the sensors deployed at the facility associated with the fleet management entity 106 may be configured to capture vehicle related information, such as dimensions of the vehicles, or more specifically, the dimensions of loading bins of individual vehicles available for loading the delivery packages associated with the one or more consignments of the consignor. Furthermore, in one illustrative example, the sensors may be configured to capture vehicle related information such as vehicle maximum weight capacity, current state, maximum volume, etc. Some examples of sensors deployed at the consignor's location or at the facility associated with the fleet management entity 106 may include image sensors, infrared sensors, inertial sensors, pressure sensors, GPS sensors, and the like.

In at least some embodiments, a consignor may share information related to the order data, including information related to individual delivery packages, to the fleet management entity 106 over a network 108. The network 108 may include, without limitation, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio frequency (RF) network, a virtual network, and/or another suitable public and/or private network capable of supporting communication among two or more entities situated at remote locations as illustrated in FIG. 1, or any combination thereof. Various entities in the environment 100 may connect to the network 108 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof.

In one embodiment, vehicular information, order data including package information, consignee information, consignee constraints, and loading constraints are stored in a database 110. Some examples of the loading constraints may include, but are not limited to, package stacking rules (i.e., rules that define which packages can be placed in which orientations and what weighing capacities can be put above them), package combination rules (i.e., rules that define which packages can be shipped together and which packages cannot be shipped together due to reasons such as material shelf-life, fragile nature of transported goods, etc.), limits on loading and unloading time and labor costs, and the like. Some examples of consignee constraints may include destination characteristics (i.e., criteria that define which packages of a destination location can be combined with packages of another destination locations), preferred delivery routes, delivery window, and the like. The loading and consignee constraints are collectively referred to as 'plurality of constraints' hereinafter.

In an example scenario, a consignor, such as the owner of the warehouse 102, may request services of the fleet management entity, such as the fleet management entity 106, to deliver consignments to different consignee locations. The consignor may provide order related information, for example, number of consignees, package information related to each consignee and one or more constraints to the fleet management entity 106 over the network 108.

The fleet management entity 106 may wish to optimize the delivery of consignments, for example, by minimizing the delivery cost for the consignor. To this effect, the fleet management entity 106 may use a system 150 to determine: (1) the optimal number of vehicles to deploy for fulfilling the consignment delivery request of the consignor, (2) the optimal selection of packages to be loaded into individual selected vehicles, (3) the optimal sequence of loading the packages in the vehicles and (4) the optimal route for dropping the packages to the intended consignees. The system 150 may be implemented as a centralized or a distributed server system capable of being accessed over a communication network, such as the network 108. In some embodiments, the system 150 may be associated with the fleet management entity 106 itself. Alternatively, the system 150 may be associated with a third-party freight management entity (not shown in FIG. 1), which is configured to provide the services of the system 150 in exchange for a fee.

In at least some embodiments, the system 150 is configured to receive information related to the available vehicles (i.e., vehicle related information) at the facility associated with the fleet management entity 106 and the order data (for example, package related information) provided by the consignor, either directly from the fleet management entity 106 or from the database 110 over the network 108. The system 150 may be configured to use a deep reinforcement learning (DRL) based machine learning model to generate a loading plan specifying how to optimally load the packages in the vehicles subject to the delivery constraints such that the overall delivery cost is minimized. The loading plan also specifies the number of consignees and the drop locations for each vehicle, in effect configuring a routing plan to be followed by the vehicles for delivering the packages at different consignee locations as exemplarily depicted by consignee locations B, C, D, E, F, G, H, I, J, K, L, M and N in a route map 112 in FIG. 1. As an illustrative example, the vehicle 104a is adapted to deliver packages from a pickup location A (for example, a depot) to consignee locations J, L, M and N. In one embodiment, the fleet management entity 106 is configured to instruct one or more loading personnel (not shown) associated with the fleet management entity 106 to perform loading of the plurality of packages into the plurality of vehicles according to the loading plan generated by the system 150. The system 150 configured to generate the loading plan for minimizing the overall cost of delivering packages of the consignment is explained next with reference to FIG. 2.

Figure 2:
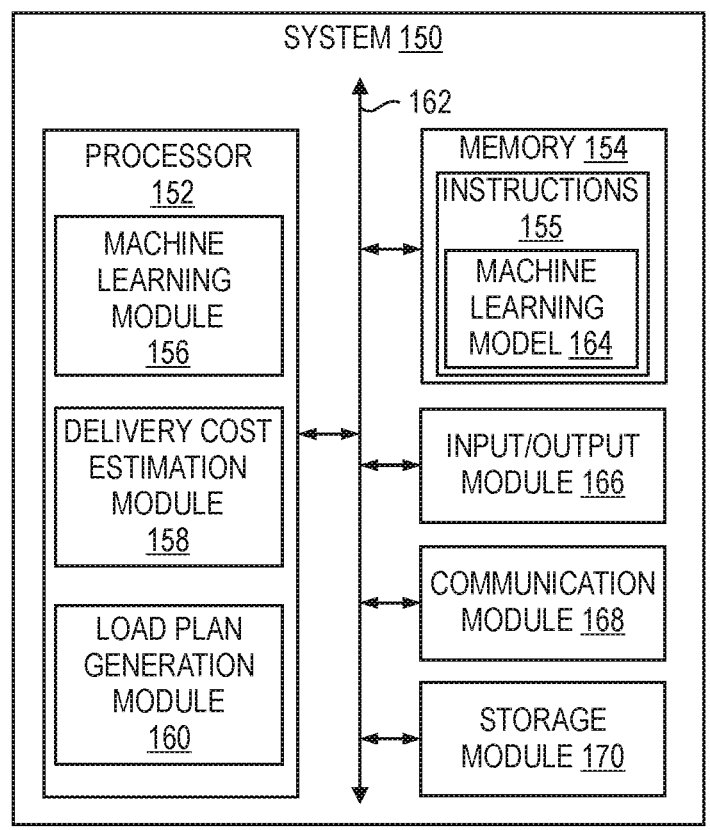
FIG. 2 is a block diagram of a system configured to optimize delivery of consignments, in accordance with an embodiment of the invention.

FIG. 2 is a block diagram of the system 150 configured to optimize delivery of consignments, in accordance with an embodiment of the invention. As explained with reference to FIG. 1, system 150 may be implemented in a server accessible over a communication network, such as the network 108 shown in FIG. 1.

The system 150 includes at least one processor, such as a processor 152 and a memory 154. It is noted that although the system 150 is depicted to include only one processor, the system 150 may include more number of processors therein. In an embodiment, the memory 154 is capable of storing machine executable instructions, referred to herein as instructions 155. Further, the processor 152 is capable of executing the instructions 155. In an embodiment, the processor 152 may be embodied as a multi-core processor, a single core processor, or a combination of one or more multi-core processors and one or more single core processors. For example, the processor 152 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 152 may be configured to execute hard-coded functionality. In an embodiment, the processor 152 is embodied as an executor of software instructions, wherein the instructions may specifically configure the processor 152 to perform the algorithms and/or operations described herein when the instructions are executed. In at least one embodiment, the processor 152 includes a machine learning module 156, a delivery cost estimation module 158 and a load plan generation module 160. The modules of the processor 152 are explained in further detail later.

The memory 154 may be embodied as one or more volatile memory devices, one or more non-volatile memory devices, and/or a combination of one or more volatile memory devices and non-volatile memory devices. For example, the memory 154 may be embodied as semiconductor memories (such as mask ROM, PROM (programmable ROM), EPROM (erasable PROM), flash memory, RAM (random access memory), etc.), magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc) and BD (BLU-RAY® Disc).

In at least some embodiments, the memory 154 stores the instructions 155 which may be used by modules of the processor 152 such as the machine learning module 156, the delivery cost estimation module 158 and the load plan generation module 160. For example, the instructions 155 stored in the memory 154 include code/instructions related to one or more machine learning models, such as a deep reinforcement learning (DRL) based machine learning model 164, which is capable of being trained for a predefined objective function by the machine learning module 156. One example of the predefined objective function corresponds to an objective of minimizing the cost of delivering packages related to a consignment from one or more pickup locations to one or more drop locations. Another example of the predefined objective function may correspond to the objective of minimizing the time involved in delivering packages related to a consignment from one or more pickup locations to one or more drop locations. Though the memory 154 is depicted to include only one DRL based machine learning model 164, it is noted that the memory 154 may include other machine learning models, heuristic algorithms and the like. The DRL based machine learning model 164 is hereinafter referred to as a machine learning model 164. The machine learning model 164 may at least include a plurality of input processing layers, a network of nodes representing correlations between model states and actions and network parameters (i.e. weights) as will be explained in detail with reference to FIGS. 3, 4 and 5.

As explained above, the memory 154 also stores code/instructions, which are used by the delivery cost estimation module 158 and the load plan generation module 160. In at least some embodiments, the delivery cost estimation module 158 may use the instructions stored in the memory 154 to compute an overall cost estimate for delivering the plurality of packages associated with consignment based on an input provided by the machine learning module 156. Further, in at least some embodiments, the load plan generation module 160 may use the instructions stored in the memory 154 to generate a loading plan based on an input provided by the machine learning module 156 and the delivery cost estimation module 158. The term 'loading plan' as used herein refers to a plan or a strategy that includes a sequence of loading actions to be performed to achieve the objective of delivering the plurality of packages with the minimum cost, while taking into consideration the plurality of constraints. In one embodiment, the loading plan outlines: (1) the number of vehicles (or delivery trucks) that are needed to accommodate all the packages associated with a consignment delivery to a plurality of consignees, (2) the vehicle type/make, the vehicle model and the vehicle identification number of the selected vehicles, (3) the identification of which package goes to which destination location and needs to be accommodated in which vehicle, (4) the sequence of loading and optimal placement of the packages in each vehicle selected for delivery, (5) the number of consignees to deliver to, the number of drop locations and a route to be followed by each selected vehicle, and (6) a listing of stacking, loading and unloading constraints associated with the delivery of packages related to the consignment delivery. The functionalities performed by the modules of the processor 152 to enable generation of the optimal loading plan is explained in further detail later with reference to FIGS. 3 to 7. The term 'optimal loading plan' as used herein refers to a loading plan that maximizes capacity utilization of vehicles while minimizing a delivery cost for shipping the delivery packages to different consignee locations.

The system 150 also includes an input/output module 166 (hereinafter referred to as an 'I/O module 166') and at least one communication module such as a communication module 168. In an embodiment, the I/O module 166 may include mechanisms configured to receive inputs from and provide outputs to the user of the system 150. To that effect, the I/O module 166 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like.

In an example embodiment, the processor 152 may include I/O circuitry configured to control at least some functions of one or more elements of the I/O module 166, such as, for example, a speaker, a microphone, a display, and/or the like. The processor 152 and/or the I/O circuitry may be configured to control one or more functions of the one or more elements of the I/O module 166 through computer program instructions, for example, software and/or firmware, stored on a memory, for example, the memory 154, and/or the like, accessible to the processor 152.

The communication module 168 may include communication circuitry such as for example, a transceiver circuitry including antenna and other communication media interfaces to connect to a wired and/or wireless communication network. The communication circuitry may, in at least some example embodiments, enable reception/transmission of information from remote network entities, such as sensors configured to capture multi-sensory data related to packages and vehicles or the database 110 (shown in FIG. 1) configured to maintain real-time information related to consignment delivery orders such as, number of packages, package dimensions, consignee information, number of available vehicles, vehicle capacity, etc.

In at least one example embodiment, the communication module 168 is configured to receive real-order data in relation to delivering a consignment including a plurality of packages. The plurality of packages is to be delivered from at least one pickup location, such as the warehouse 102 (shown in FIG. 1), to a plurality of drop locations associated with a plurality of consignees. In at least one embodiment, the real-order data includes package related information corresponding to the plurality of packages and vehicle related information corresponding to a plurality of vehicles available for delivering the consignment.

The package related information may include information related to number of packages, consignee ID related to each package, package dimensions, package volume, top view of each package, package status, a package number, package shelf life and package material characteristics. Similarly, the vehicle related information may include information related to number of vehicles, a maximum capacity of each vehicle, and a top view of storage space or bin of the vehicle (i.e., length, breadth of a container space, etc.). The communication module 168 is configured to forward the real-order data to the processor 152. The modules of the processor 152 in conjunction with the instructions stored in the memory 154 may be configured to process the real-order data and generate an optimal loading plan for the consignment delivery, i.e. a loading plan that maximizes capacity utilization of vehicle and/or minimizes a delivery cost of delivering the one or more packages associated with the consignment.

The system 150 also includes a storage module 170, which may be embodied as any computer-operated hardware suitable for storing and/or retrieving data. In one embodiment, the storage module 170 is configured to store information related to previous delivery consignments (also known as historical orders), such as the number of number of consignees, number of packages delivered to each consignee, the package dimensions, the number of vehicles deployed, the route followed, the placement of packages within each vehicle and a sequence of loading the packages, etc. The information related to previous delivery consignments, i.e. historical orders, is referred to hereinafter as historical-order data. The storage module 170 may also store information related to the machine learning model type, the machine learning model objective, the network parameters or weights of the machine learning model used for planning the delivery consignment, and the like.

The storage module 170 may include multiple storage units such as hard disks and/or solid-state disks in a redundant array of inexpensive disks (RAID) configuration. In some embodiments, the storage module 170 may include a storage area network (SAN) and/or a network attached storage (NAS) system. In one embodiment, the storage module 170 may correspond to a distributed storage system, wherein individual databases are configured to store custom information, such as, information related to the machine learning model type, the machine learning model objective, the network parameters or weights of the machine learning model used for planning the delivery consignment, and the like. Though the storage module 170 is depicted to be integrated within the system 150, in at least some embodiments, the storage module 170 is external to the system 150 and may be accessed by the system 150 using a storage interface (not shown in FIG. 2). The storage interface is any component capable of providing the processor 152 with access to the storage module 170. The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 152 with access to the storage module 170.

In one embodiment, various components of the system 150, such as the processor 152, the memory 154, the I/O module 166, the communication module 168 and the storage module 170 are configured to communicate with each other via or through a centralized circuit system 162. The centralized circuit system 162 may be various devices configured to, among other things, provide or enable communication between the components of the system 150. In certain embodiments, the centralized circuit system 162 may be a central printed circuit board (PCB) such as a motherboard, a main board, a system board, or a logic board. The centralized circuit system 162 may also, or alternatively, include other printed circuit assemblies (PCAs) or communication channel media.

As explained above, the machine learning module 156 is configured to train machine learning models such as the machine learning model 164 to optimize an objective function. The objective function may be configured based on an input provided by a user/operator of the system 150. For example, a user may provide an input indicative of the user's desire to minimize an overall cost of delivering a consignment. The machine learning module 156 is configured to generate an objective function based on such a user input. For example, the machine learning module 156 may define an objective function in the following manner using equation (Eqn.) (2):

$$\text{delivery\_charge} = \text{vehicle\_charge} + (\text{num\_cons} - 1) * \text{drop\_charge} \qquad \text{Eqn. (2)}$$

wherein delivery_charge is a cost of using a vehicle selected for package delivery (i.e., selected for delivering at least some packages of the consignment), vehicle_charge is a fixed charge associated with the selected vehicle, num_cons is a number of consignees that the selected vehicle will deliver to, and drop_charge is a fixed drop-off charge for each delivery at a drop location for the selected vehicle. The overall cost of delivering the consignment is derived by summing delivery charges of the selected vehicles.

Such a formulation of the objective function is configured to target minimization of the overall cost by aiming to optimize a number of vehicles required for consignment delivery by efficiently packing the loading spaces in the vehicles (i.e., solve the 3D Bin packing problem) while also optimizing a route to deliver consignment packages subject to loading and consignee/consignment constraints by minimizing the number of consignees and the drop locations (i.e., solve the CVRP problem). In effect, the objective function, which is a formulation of a CVRP problem as the 3D bin packing problem, when optimized is configured to minimize the overall cost of delivering packages of the consignment to a plurality of consignees.

The machine learning module 156 is further configured to select a deep reinforcement learning (DRL) based machine learning (ML) model from among the plurality of ML models stored in the memory 154 based on the objective function formulated from the input provided by a user/operator of the system 150. The machine learning module 156 is further configured to train the DRL based ML model, such as the machine learning model 164, to learn correlations between different package dimensions and changing bin sizes as the delivery packages are loaded in the bins (i.e. the loading spaces in the trucks) to achieve the objective, i.e. minimize the overall cost of delivering the consignments. The correlations learnt are not only limited to geometrical or spatial correlations, but the DRL based ML model is also trained to take temporal correlations into consideration while aiming to achieve the objective of minimizing the overall delivery cost. More specifically, in addition to finding the optimal placement of delivery packages in available loading bins, the DRL based ML model also identifies the optimal sequence of loading delivery packages related to the consignment to maximize packing efficiency while minimizing the overall cost of delivering the consignments.

To this effect, in at least some embodiments, the machine learning module 156 is configured to pre-process the package related information and the vehicle related information in the real-order data to generate a plurality of inputs. The plurality of inputs is then provided to a plurality of input processing layers of the machine learning model 164 to generate a combined feature space of all valid loading actions. The generation of the combined feature space from the plurality of inputs is explained next with reference to FIG. 3.

Figure 3:
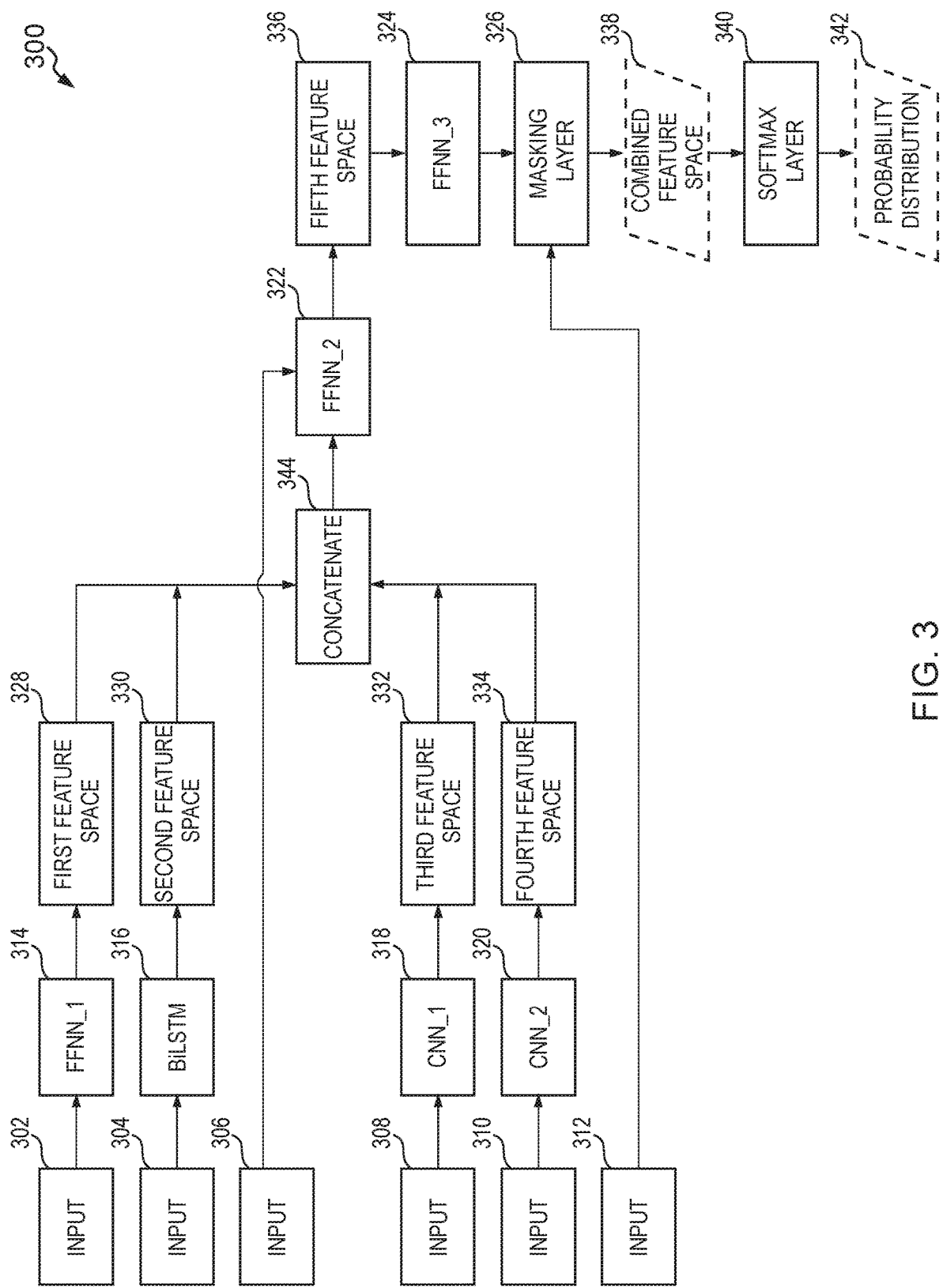
FIG. 3 is a schematic representation for illustrating a processing of the plurality of inputs by the plurality of input processing layers of a machine learning model, in accordance with an embodiment of the invention.

FIG. 3 is a schematic representation 300 for illustrating a processing of the plurality of inputs by the plurality of input processing layers of the machine learning model 164 (shown in FIG. 2), in accordance with an embodiment of the invention.

As explained with reference to FIGS. 1 and 2, the system 150 is configured to use a DRL based machine learning model, such as the machine learning model 164 (shown in FIG. 2) for optimizing an objective function, such as an objective function related to minimizing an overall cost of delivering packages related to a consignment to a plurality of consignees. Further, the objective function is formulated in a manner such that the CVRP is modeled as a 3D bin packing problem.

Prior to the deployment of the machine learning model 164 for real customer orders, the machine learning model 164 needs to be trained for optimizing the objective function. To train the machine learning model 164, the machine learning module 156 (shown in FIG. 2) is configured to fetch historical-order data related to at least one historical order from the storage module 170. In at least one embodiment, the fetched historical-order data configures the training data set for training the machine learning model 164.

As explained with reference to FIG. 1, a consignor(s) associated with the consignment delivery may provide order related information, such as for example, number of consignees, package information related to each consignee, one or more constraints such as package stacking constraints, etc. The information related to individual packages may include information, such as dimensions of each package (such as for example volume of a package), weight of each package, package content, and the like. In at least one embodiment, information such as package dimensions, weight of the package, etc., may be captured using sensors installed at various locations of consignor location or at a fleet management entity's location, such as a warehouse 102 shown in FIG. 1. Further, the sensors deployed at the facility associated with the fleet management entity may be configured to capture dimensions of the vehicles, or more specifically, the dimensions of loading bins of individual vehicles available for loading the packages associated with the one or more consignments of the consignor. The sensors may be configured to capture information such as vehicle maximum weight capacity, current state, maximum volume, etc.

Accordingly, the historical-order data may include information related to each freight package information and freight vehicle information. It is noted that though there is no difference between the terms 'packages' and 'freight packages' or the term 'vehicles' and 'freight vehicles', the term 'freight' is associated with packages and vehicles to distinguish historical-order data related information and real-order data related information for purposes of the description.

In one illustrative example, freight vehicle information may include information related to a number and type of freight vehicles available for loading of freight packages, a top view of a loading bin of each freight vehicle to provide length, breadth and height dimensions of the loading bin, and the like. Further, the freight vehicle information may also include vehicle related constraints such as, maximum weight capacity, maximum volume, etc. of each freight vehicle. The freight package information may include information related to a number of freight packages, dimensions of each freight package, weight of each freight package, material characteristics of each freight package, and stacking constraints related to loading/placing of freight packages in the freight vehicles. In addition, the historical-order data may also include information related to number of consignees, drop locations and loading/unloading constraints such as maximum loading time, maximum unloading time, entry/exit restrictions for vehicular movement associated with locations on the travel route, and the like. Further, the historical-order data may include time-series data related to loading of freight packages in the freight vehicles.

As the freight package information and the freight vehicle information may be available in different units, the machine learning module 156 is configured to pre-process the freight package information and freight vehicle information, i.e., convert the freight package information and freight vehicle information into a format that can be used for providing such information as an input to the input processing layers of the machine learning model 164. For example, the pre-processing of the historical-order data by the machine learning module 156 may generate a plurality of inputs such as:

1. a tensor input representing a top-view of each freight vehicle
2. a tensor input representing a top-view of a current freight package
3. tensor embedding input representing a number of freight vehicles and a remaining capacity of the freight vehicles at each time step associated with loading of a freight package
4. tensor embedding input representing the current freight package
5. tensor embedding input representing remaining freight packages to be placed in the freight vehicle at future time steps, and
6. a tensor input configured to apply a mask over invalid actions These inputs are shown as inputs 302, 304, 306, 308, 310 and 312 in FIG. 3. More specifically, the input 302 corresponds to a tensor embedding input representing a number of freight vehicles and a remaining capacity of the freight vehicles at each time step. The input 304 corresponds to a tensor embedding input representing remaining freight packages. The input 306 corresponds to a tensor embedding input representing the current freight package. The input 308 corresponds to a tensor input representing a top-view of each freight vehicle. The input 310 corresponds to a tensor input representing a top-view of a current freight package. The input 312 corresponds to a tensor input configured to apply a mask of invalid actions. The inputs 302 to 312 are provided to the various input processing layers of the machine learning model 164 as will be explained hereinafter.

The input processing layers of the machine learning model 164 are exemplarily shown as a first feed-forward neural network layer (shown as or FFNN_1 314), a dynamic Bidirectional LSTM layer (shown as BiLSTM 316), a first convolutional neural network layer (shown as CNN_1 318), a second CNN layer (shown as CNN_2 320), a second feed-forward neural network layer (shown as FFNN_2 322), a third feed-forward neural network layer (shown as FFNN_3 324) and a masking layer 326. The various input processing layers and the inputs provided to each layer are explained below:

FFNN_1 314: The machine learning module 156 is configured to provide the input 302, i.e. an input corresponding to the tensor embedding input representing the number of freight vehicles and the remaining capacity of the freight vehicles at each time step associated with loading of a freight package, to the FFNN_1 314. In other words, the machine learning module 156 is configured to provide available container capacities of the freight vehicles to the first FFNN layer. The FFNN_1 314 is configured to generate a first feature space 328 for the input 302. In one example, the FFNN_1 314 includes 32 hidden units and is configured to apply a Rectified Linear unit (ReLU). In order to use stochastic gradient descent with back propagation of errors to train hidden units, an activation function is needed that looks and acts like a linear function, but is, in fact, a nonlinear function allowing complex relationships in the data to be learned. The first feature space 328 is provided to a batch-normalization layer (not shown in FIG. 3) before further processing.

BiLSTM 316: The machine learning module 156 is configured to provide the input 304, i.e. an input corresponding to the tensor embedding input representing the remaining freight packages to the BiLSTM 316. Such an input may include information, such as number of packages, consignee ID, weight, volume of remaining packages to be placed in the available freight vehicles after a current time stamp in future. The BiLSTM 316 is configured to capture sequential nature of package placements and generate a second feature space 330 for the tensor embedding input (i.e. the input 304). As the packages are placed, the number of future packages decreases. Accordingly, a dynamic recurrent neural network (RNN) is incorporated in the BiLSTM 316 to mask out already placed packages in the sequence. The bi-directionality is added to the BiLSTM 316 to ensure that the second feature space 330 can capture the context of the current and future placements for the packages. In one example, the BiLSTM 316 is initialized with 128 hidden units and a ReLU non-linearity. The second feature space 330 is provided to a batch-normalization layer (not shown in FIG. 3) before further processing.

CNN_1 318: The machine learning module 156 is configured to provide the input 308, i.e. an input corresponding to the tensor input of a top-view of each freight vehicle. In one illustrative example, top views of loading bins of each freight vehicle are expressed in the form of a multidimensional matrix based on 3D grid space (as will be shown in FIG. 6) and provided to the CNN_1 318. In one embodiment, CNN_1 318 includes 64 convolutional filters (depicting 64 features to be learnt by the first CNN layer) and ReLU non-linearity activation function is applied to the CNN_1 318 to generate a third feature space 332. The third feature space 332 generated by the CNN_1 318 is passed through a batch normalization layer (not shown in FIG. 3) before further processing.

CNN_2 320: The machine learning module 156 is configured to provide the input 310, i.e. an input corresponding to the tensor input representing the top-view of the current freight package that needs to be placed at the current time step, to the CNN_2 320. In one embodiment, the CNN_2 320 includes 32 convolutional filters and a ReLU non-linearity. The CNN_2 320 is configured to generate a fourth feature space 334 for the input 310 that is then passed through a batch normalization layer (not shown in FIG. 3) before further processing.

FFNN_2 322: The machine learning module 156 is configured to concatenate (shown as 344 in FIG. 3) the input 306, i.e. the input corresponding to the tensor embedding input representing the current freight package with normalized values of the first feature space 328, the second feature space 330, the third feature space 332 and the fourth feature space 334 obtained from the FFNN_1 314, the BiLSTM 316, the CNN_1 318 and the CNN_2 320, respectively. Thereafter, the machine learning module 156 is configured to provide the concatenated output to the FFNN_2 322. In one embodiment, the FFNN_2 322 includes a number of hidden neurons (e.g., up to 1000). The number of hidden neurons is configured to create a fifth feature space 336 capable of capturing the details presented from the aforementioned input layers. Further, the FFNN_2 322 is initialized with a ReLU non-linearity.

FFNN_3 324: The third FFNN layer or the FFNN_3 324 is configured to generate raw prediction vectors called logits over the whole action space based on the output of the FFNN_2 322. The logits represent combined feature space of all possible loading actions that can be taken during loading of packages in vehicles, where each loading action corresponds to placement of a selected package in a selected position in a loading bin of a selected vehicle from among the selected vehicles at a loading step. The number of hidden units is thus equal to the number of freight vehicles. The ReLU non-linearity is not applied in this layer. The combined feature space of all possible loading actions is passed through a batch-normalization layer (not shown in FIG. 3) before further processing.

The masking layer 326 is configured to receive the combined feature space of all possible loading actions from the FFNN_3 324. The masking layer 326 is also configured to receive an input 312, i.e. an input corresponding to the tensor input configured to apply a mask of invalid actions, which is configured to reduce a feature search space. In one illustrative example, a user/operator of the system 150 (shown in FIG. 2) is configured to provide an input related to constraints, such as stacking constraints, loading constraints, unloading constraints, and the like. The pre-processing performed by the machine learning module 156 is configured to generate a set of invalid actions, such as certain packages cannot be delivered in the same vehicle (for example, inflammable items cannot be placed next to combustible items), certain packages include fragile contents and cannot be stacked at the bottom of the loading bin, certain packages are to be delivered at destination locations, which place restriction on entry/exit of vehicles during a particular time slot, etc. Thus, the masking layer 326 is configured to mask out invalid actions in the combined feature space of all possible loading actions to generate a combined feature space of all valid loading actions 338 (shown as combined feature space 338 in FIG. 3). The combined feature space of all valid loading actions 338 defines an action space of the machine learning model 164.

The machine learning model 164 may also include a softmax layer 340, which includes a softmax function configured to produce a probability distribution 342 over the entire action space, i.e. over the combined feature space of all valid loading actions 338. In one embodiment, after the invalid action masks are applied on the raw predictions vectors, the masked raw prediction vectors are then fed to a softmax layer 340. In an illustrative example, a set of loading actions may be denoted by A={a0, a1, a2, a3} and a set of states, S={s1, s2}, where s1 may be an optimal state. Considering that the action a2 is invalid for the state s0, the only valid actions may be a0, a1, and a3. Invalid action masking helps to avoid invalid actions by masking out the raw prediction vectors corresponding to the invalid actions. The masking out is carried out by replacing the invalid actions by a large negative number such as (−100). By doing so, the probabilities of the invalid actions calculated by the softmax layer 340 in the probability distribution 342 may be closer to zero. In cases, where the invalid actions are not considered, all the remaining actions may be used to determine the probability distribution over the action space.

In effect, the processing performed by the various input processing layers of the machine learning model 164 is configured to provide a combined feature space, i.e. a collection of all valid actions that are possible vis-à-vis loading of the freight packages in the freight vehicle. A probability value is also associated with each action to indicate a probability of the corresponding action being performed at a loading step while loading of the freight packages in the freight vehicles. In a simplified illustrative example, a historical-order data may indicate availability of 10 vehicles of different loading bin sizes and a freight consignment order of delivering 100 freight packages. The processing performed by the various input processing layers of the machine learning model 164 may result in combined feature space of 10000 valid actions, i.e. 10000 different actions are possible vis-à-vis loading of the freight packages in the freight vehicles based on different placement and orientation of individual freight packages within each freight vehicle among any of the ten available freight vehicles. It is noted that the masking of invalid actions drastically reduces the feature space to be used for predicting the selection and placement of a next package in a vehicle, given a current state of the machine learning model 164.

In at least one embodiment, the machine learning module 156 is configured to simulate a plurality of episodes iteratively, where each episode entails sequentially placing one or more freight packages into a plurality of freight vehicles to configure a particular placement sequence. More specifically, the machine learning module 156 is configured to execute different combinations of loading actions (for example, from among 10000 valid loading actions) to complete the loading of freight packages in the available freight vehicles. At each loading step, the machine learning module 156 is configured to capture the state of the machine learning model 164, the action and a loading timestamp. More specifically, at each loading step, the machine learning module 156 is configured to capture top views of loading bins of all freight vehicles involved in the consignment delivery to determine an extent of capacity already occupied by freight packages and what extent of capacity is remaining to be filled. Further, a current state of the machine learning model 164 may also indicate what are different options available for placing a current freight package in one of the freight vehicles. Further, the machine learning module 156 is configured to capture the action, i.e., the act of loading a current freight package associated with a consignee ID, physical dimensions, weight and material characteristics in one of the options available for placing the current freight package in one of the freight vehicles. The machine learning module 156 is also configured to capture the loading timestamp, or more specifically, a sequence number of the loading step from among a plurality of loading steps associated with sequential loading of the freight packages in the freight vehicles. In at least some embodiments, the state-action pairs at each loading step are stored in the storage module 170. It is noted that each state-action pair represents a placement of a single freight package in a particular freight vehicle in response to a particular state of the machine learning model 164.

For each completed sequence of loading freight packages associated with the freight consignment delivery in available freight vehicles, a delivery cost is computed by using the delivery cost estimation module 158. In at least some embodiments, the delivery cost estimation module 158 may use the Eqn. (1) explained with reference to FIG. 1 to compute the delivery cost for each combination of loading sequences leading to completed loading of freight packages in the freight vehicles. A sequence of loading actions that led to a lowest delivery cost is identified. The lowest delivery cost is chosen as a reference or a baseline cost for the objective function related to minimizing the overall delivery cost. The machine learning model 164 is configured to associate a positive and negative reward value to each state-action pair based on their predicted ability to affect the state of loading the freight vehicles to achieve the reference cost. It is noted that each state-action pair represents a placement of a single freight package in a particular freight vehicle in response to a particular state of the machine learning model 164. For example, if a state-action pair is predicted to positively contribute to reaching the reference cost (i.e. enable lowering or at least achieving the reference cost), then a positive reward value is associated with the state-action pair. Similarly, if a state-action pair is predicted to negatively contribute to reaching the reference cost (i.e. cause an increase in the reference cost), then a negative reward value is associated with the state-action pair. The reward value (R) associated with each state-value pair is stored as a (state, action, reward) triplet. Such a positive/negative reinforcement of each state-action pair in the action space by the DRL based machine learning model 164 is further explained with reference to FIG. 4.

Figure 4:
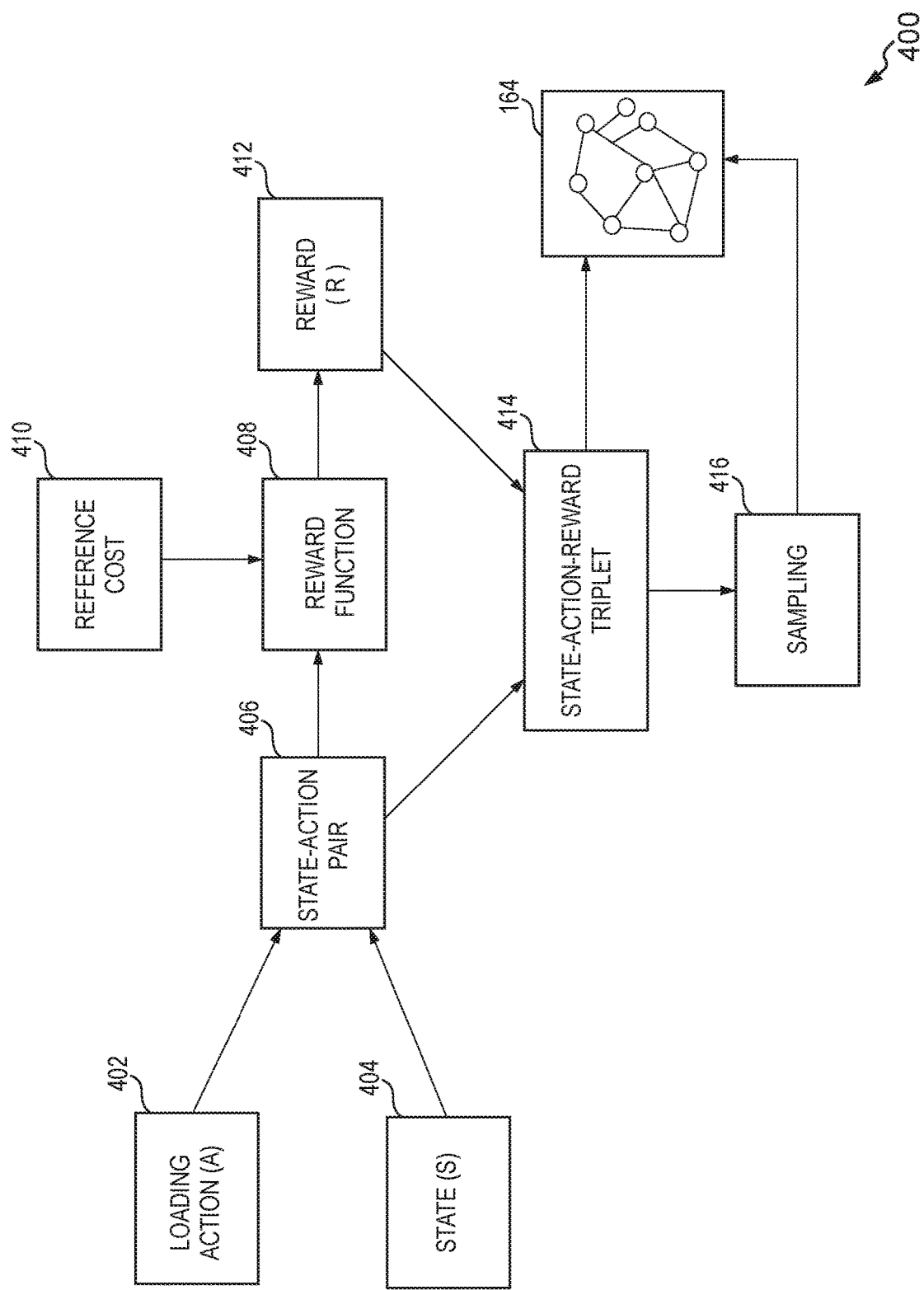
FIG. 4 shows a schematic representation for illustrating an assignment of a reward value to a state-action pair by a machine learning module of the system of FIG. 2 for facilitating training of a machine learning model, in accordance with an embodiment of the invention.

Referring now to FIG. 4, a schematic representation 400 is shown for illustrating an assignment of a reward value to a state-action pair by the machine learning module 156 of FIG. 2 for facilitating training of a machine learning model 164, in accordance with an embodiment of the invention.

As explained with reference to FIG. 3, several inputs are provided to the input processing layers of the machine learning model 164 by the machine learning module 156 to generate a combined feature space indicative of all possible valid actions in relation to loading of freight packages in the freight vehicles. Further, as explained with reference to an illustrative example, 10000 valid actions may be possible in relation to loading of 100 freight packages in ten available freight vehicles. Further, for each completed episode of simulated loading of freight packages associated with the freight consignment delivery in available freight vehicles, a delivery cost is computed by using the delivery cost estimation module 158. Further, a sequence of loading actions that led to a lowest delivery cost is identified, and the lowest delivery cost is considered as a reference cost.

Accordingly, in the schematic representation 400 of FIG. 4, the machine learning module 156 performs a loading action (A) 402 at a loading step, i.e. the act of placing a single freight package at one of the available options for placing the freight package in a single freight vehicle. The state (S) 404 of the machine learning model 164 prior to performing the loading action (A) 402 is also obtained by the machine learning module 156. In at least some embodiments, the state (S) 404 of the machine learning model 164 may be obtained by capturing top views of loading bins of the selected freight vehicles prior to performing the loading action (A) 402. The captured top views of the loading bins may be indicative of the extent to which the freight vehicles are already filled and what is the remaining capacity of the freight vehicles. Further, the state (S) 404 may also be indicative of the freight packages already loaded in the freight vehicles and the freight packages that are yet to be loaded in the freight vehicles.

The loading action (A) 402 and the corresponding state (S) 404 are provided as input in the form of a state-action pair 406 to a reward function 408 maintained by the machine learning module 156. The reward function 408 is also configured to receive the input related to a reference cost 410. The reward function 408 is configured to associate a positive or a negative value as a reward (R) 412 to each state-action pair, such as the state-action pair 406, based on their predicted ability to influence the reference cost 410. For example, if the loading action A 402, given the present state S 404 of the machine learning model 164, is predicted to positively contribute to reaching the reference cost 410 (i.e. enable lowering or at least achieving the reference cost 410), then a positive reward (R) 412 is associated with the state-action pair 406. Similarly, if the loading action A 402, given the present state S 404 of the machine learning model 164, is predicted to negatively contribute to reaching the reference cost 410 (i.e. cause an increase in the reference cost), then a negative reward (R) 412 is associated with the state-action pair 406. The reward (R) 412 associated with each state-action pair, such as the state-action pair 406, is stored as a state-action-reward triplet 414.

In at least one embodiment, the state-action-reward triplets, such as the state-action-reward triplet 414, are configured to facilitate learning of correlations between different package dimensions and changing bin sizes as the freight packages are loaded in the bins (i.e., the loading spaces in the freight vehicles like trucks) to achieve the objective, i.e., minimize the overall cost of delivering the consignments. The correlations learnt are not only limited to geometrical or spatial correlations i.e., correlations between placement of different freight packages at different locations, but the machine learning model 164 is also trained to take temporal correlations into consideration while aiming to achieve the objective of minimizing the overall delivery cost. More specifically, in addition to finding the optimal placement of packages in available loading bins, the DRL based machine learning model 164 also identifies the optimal sequence of loading packages related to the consignment to maximize packing efficiency while minimizing the overall cost of delivering the consignments. The learnt spatial and temporal correlations serve as network parameters, such as weights, for various features in the action space, which help the machine learning model 164 in predicting not only a number and type of vehicles required for delivering the packages related to a consignment, but also in predicting loading actions to be taken to ensure 3D fitment of the delivery packages with maximum efficiency within the loading bins of the delivery vehicles. As such, the learnt spatial and temporal correlations result in a trained machine learning model 164, which is capable of predicting next actions during each stage of the consignment delivery planning process.

In at least some embodiments, the machine learning module 156 is further configured to perform sampling 416 to test the trained machine learning model 164. As explained above, each state-action pair is associated with a positive or negative reward. The machine learning module 156 is configured to identify a predefined number of actions associated with top reward values at each loading step or at each state of the vehicle during the loading process and execute combinations of state-action sequences to determine if the reference cost can further be lowered, which in turn may assist in further refining the spatial and temporal correlations between actions in the feature space and finetuning the weights of the learnt machine learning model 164. In the illustrative example discussed above, wherein 100 freight packages are to be delivered to various consignees and 10 freight vehicles are available for consignment delivery, a feature space of 10000 valid actions is first identified. Thereafter, a reference cost for the consignment delivery is determined as explained above and each of 10000 valid actions is assigned a positive/negative reward value based on their ability to positively/negatively influence the lowest delivery cost, i.e. the reference cost. Further, to test the learnt correlations in relation to actions and loading sequences, at each state of the machine learning model 164, prior to loading a freight package from among the 100 freight packages in a freight vehicle from among the 10 freight vehicles, a predefined number (say 10) actions associated with top reward values are identified. For 100 freight packages, i.e., for 100 loading steps, one combination of top action for each step is attempted to determine if the reference cost can further be lowered. If yes, the lower delivery cost is chosen as the new reference cost and the spatial and temporal correlations in relation to actions and loading sequences are further finetuned to complete the training process for the machine learning model 164.

As explained above, the machine learning model 164 is configured to update the neural network parameters based on sampled triplets (i.e., state-action-reward combinations). In particular, the machine learning module 156 adjusts neural network parameters of the machine learning model 164 using the sampled combination pairs through a back-propagation process. The server system calculates a reinforce loss function for each episode that is enabled with actor-critic to reduce the variance. The running of a new episode is stopped when a convergence point is met. The convergence point refers to a cumulative reward value for the state-action pairs for an episode that has been maximized to a predefined threshold value. In one embodiment, the convergence point refers to the reinforce loss function of the episode being lower than a preset value.

Figure 5:
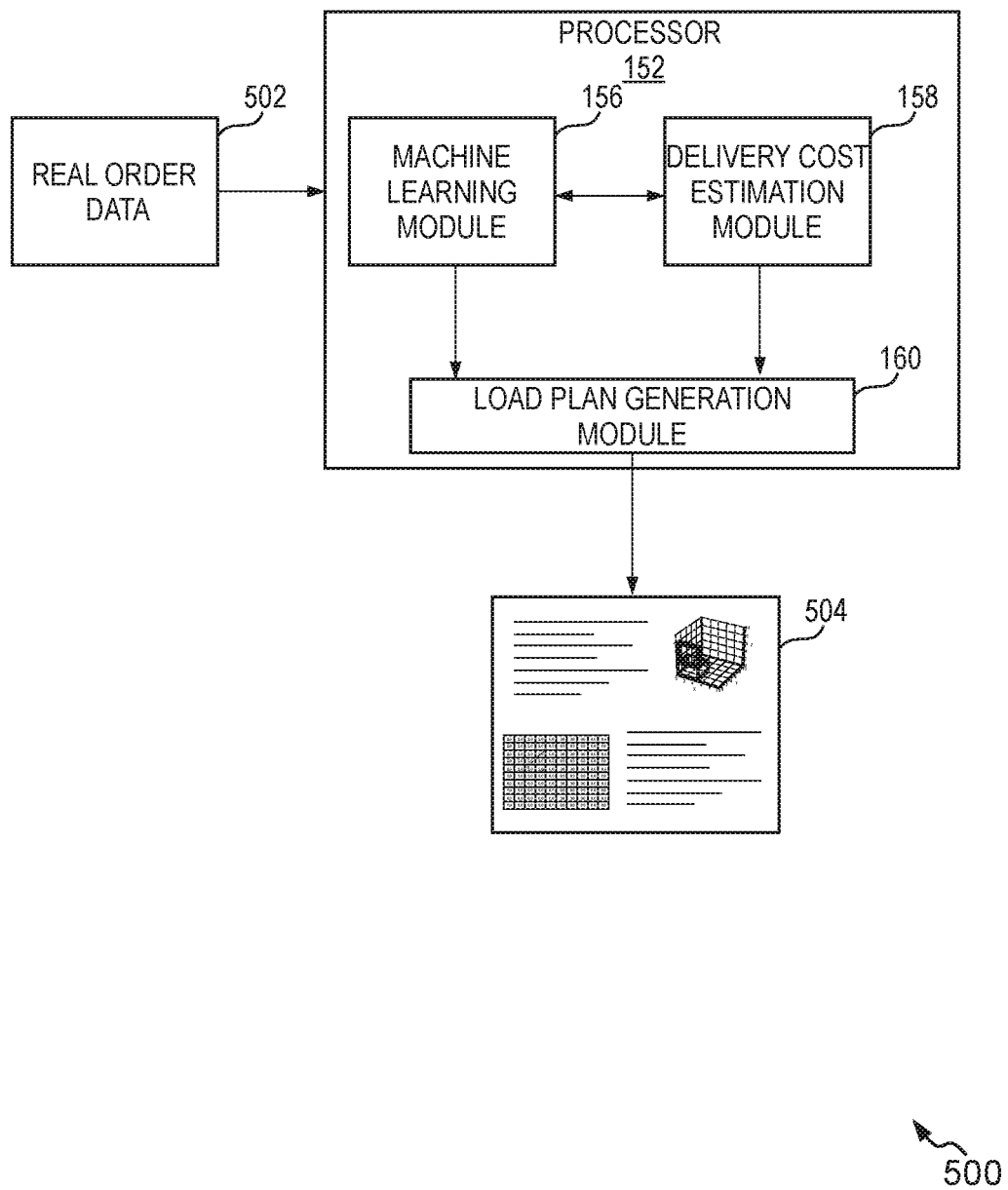
FIG. 5 shows a schematic representation for illustrating processing of a real-order data by the system of FIG. 2 in relation to delivering a consignment including a plurality of packages, in accordance with an embodiment of the invention.

FIG. 5 shows a schematic representation 500 for illustrating processing of a real-order data by the system 150 in relation to delivering a consignment including a plurality of packages, in accordance with an embodiment of the invention.

As explained with reference to FIGS. 1 and 2, the system 150 is configured to receive real-order data corresponding to a consignment to be delivered to a plurality of consignees. The consignment includes a plurality of packages that is to be delivered from at least one pickup location to a plurality of drop locations associated with a plurality of consignees. One or more sensors deployed at the consignor's location may capture package related information such as the top view of each package, the dimension of each package, the weight of the package, the material characteristics of each package, and the like. In addition to the above, package related information may also include information related to the number of consignees, consignee IDs, the drop locations for delivering respective consignments to each consignee, conditions to follow while loading, stacking and unloading the delivery packages and the like.

The fleet management entity (shown as fleet management entity 106 in FIG. 1), which is supplying the vehicles, such as trucks of various sizes, for ferrying the plurality of packages also generates vehicle related information, such as number of vehicles available for delivering packages related to one or more consignees, the make/type/capacity of each available vehicle, the top view of the loading bin of each vehicle, constraints related to maximum weight/capacity associated with each vehicle, constraints related to source and destination locations, such as entry/exit time restrictions associated with each pickup/drop locations, and the like. In some embodiments, the consignor may share the package related information as mentioned above with the fleet management entity, which may then collate information shared by the consignor with vehicle related information available with the fleet management entity to configure real-order data, which is shown as real-order data 502 in the schematic representation 500. The real-order data 502 may be provided by the fleet management entity to the system 150 or the consignor and the fleet management entity may send respective package and vehicle related information to the system 150 and the system 150 is configured to collate the information as real-order data 502. In some embodiments, the consignor and fleet management entity may be the same entity (for example, an enterprise producing goods/services and delivering the goods/services to intended recipients).

In at least one embodiment, the communication module 168 (shown in FIG. 2) of the system 150 is configured to receive the real-order data 502 and forward the real-order data 502 to the processor 152 (shown in FIG. 2). The machine learning module 156 of the processor 152 is configured to receive the real-order data 502. In at least one embodiment, the machine learning module 156 is configured to preprocess the package related information and the vehicle related information in the real-order data 502 and generate a plurality of inputs from the real-order data 502. Some examples of such inputs are (1) a tensor input representing a top-view of each vehicle, (2) a tensor input representing a top-view of a current freight package, (3) tensor embedding input representing a number of freight vehicles and a remaining capacity of the freight vehicles at each time step associated with loading of a freight package, (4) tensor embedding input representing the current freight package, (5) tensor embedding input representing remaining freight packages to be placed in the freight vehicle at future time steps, and (6) a tensor input configured to apply a mask over invalid actions.

In at least one embodiment, the machine learning module 156 is configured to select a machine learning model trained using deep reinforcement learning (DRL), such as the trained machine learning model 164, to optimize an objective function of minimizing an overall cost of consignment delivery. For example, the machine learning model 164 based on deep reinforcement learning, given the combined feature space, is selected to optimize the objective function such as the objective function shown in Eqn. 1. in FIG. 2, wherein an overall delivery cost of delivering the plurality of packages associated with the consignment to the plurality of consignees has to be minimized.

The plurality of inputs is provided to the selected machine learning model 164. More specifically, the plurality of inputs generated after preprocessing the real-order data 502 is processed through various input processing layers of the machine learning model 164 to generate a combined feature space of all valid loading actions. The combined feature space of all valid loading actions defines an action space of the machine learning model 164. In at least some embodiments, the machine learning model 164 is configured to predict the sequence of loading actions based, at least in part, on the action space of the machine learning model 164.

Some examples of the input processing layers include a first feed-forward neural network (FFNN) layer, a second FFNN layer, a bi-directional long short-term memory (BiLSTM) layer, a first convolutional neural network (CNN) layer, a second CNN layer, a third FFNN layer, and a masking layer. In one embodiment, the processing of the plurality of inputs by the plurality on input processing layers may be as follows:

The first FFNN layer generates a first feature space corresponding to a tensor embedding input representing information of available loading bin capacity of each selected vehicle. The BiLSTM layer generates a second feature space corresponding to a tensor embedding input representing information of remaining packages to be placed after a current time stamp. The BiLSTM layer is configured to capture a sequential nature of package placements in the selected vehicles. The first CNN layer generates a third feature space corresponding to a tensor input representing a top view of a loading bin of each selected vehicle. The second CNN layer generates a fourth feature space corresponding to a tensor input representing a top view of a current package to be placed at the current time stamp. The second FFNN layer generates a fifth feature space based on a tensor embedding input corresponding to information of the current package and a concatenated output obtained by concatenating the first feature space, the second feature space, the third feature space and the fourth feature space. The third FFNN layer generates a combined feature space of all possible loading actions based on the fifth feature space. It is noted that the conditions related to stacking, loading and unloading provided by the consignor in addition to the vehicle constraints like maximum capacity/weight and pickup/drop location constraints like maximum loading/unloading time (or time to load/unload the delivery packages in/from the delivery vehicles), entry/exit time restrictions, etc., together configure a plurality of constraints for the purposes of delivering the consignment. The plurality of constraints is provided as an input to the masking layer of the machine learning model 164 to generate a mask of invalid actions and apply the mask on the combined feature space of all possible loading actions to generate the combined feature space of all possible valid actions.

The DRL based machine learning model 164 may use the learnt spatial and temporal correlations in relation to placing the packages (or in other words, 3D-fitting the packages) in the vehicles to predict a sequence of loading actions in relation to loading of the plurality of packages in the selected vehicles, wherein each loading action corresponds to placement of a selected package in a selected position in a loading bin of a selected vehicle from among the selected vehicles. In at least one embodiment, each loading action in the sequence of loading actions is predicted based, at least in part, on a current state of the machine learning model 164

The machine learning model 164 based on DRL may be implemented using a neural network such as a convolutional neural network, recurrent neural network or the like. As explained with reference to FIG. 3, during training, the machine learning model 164 based on DRL (hereinafter also referred to as DRL model) explores different possibilities by taking different actions and checks for the final reward (cost) led by those actions. The DRL model then modifies the neural network parameters using back propagation in such a way that reduces the probabilities of the actions for which the reward value is low and increases the probabilities of the actions for which the reward value is high. Further, since packing is a sequential process, therefore, LSTM networks are used as a neural network of the DRL model. As explained with reference to FIG. 4, a state space of the DRL model is defined, wherein each state (S) in the state space is indicative of what delivery packages are packed in the delivery vehicles and what are the remaining capacities of the delivery vehicles. In other words, the number of remaining packages to be placed and their dimensionality constraints such as weight, volume, length and breadth may be defined in the state space. In one embodiment, the state space may be defined based on the tensor embedding inputs of the top image views of the plurality of vehicles, and the tensor embedding inputs corresponding to the number of vehicles and the remaining capacity of vehicle containers in each vehicle after each time step.

The loading bin capacities of the plurality of vehicles and the loading state of each package are fed into a neural network and the neural network outputs an action (A). This process is continued till all the materials are filled in the plurality of delivery vehicles. In the end of each episode, the delivery cost estimation module 158 of the processor 152 determines an overall cost of fitment, which is then discounted over all time steps. In one embodiment, the machine learning module 156 is configured to generate a three-dimensional (3D) grid space based visual representation of a top view of a loading bin of each selected vehicle for capturing the top views of the loading bins of the selected vehicles. The 3D grid space based visual representation is configured to visually represent packages as blocks occupying corresponding volume in a 3D grid space representing the respective loading bin as further explained with reference to FIG. 6.

Figures 6, 7:
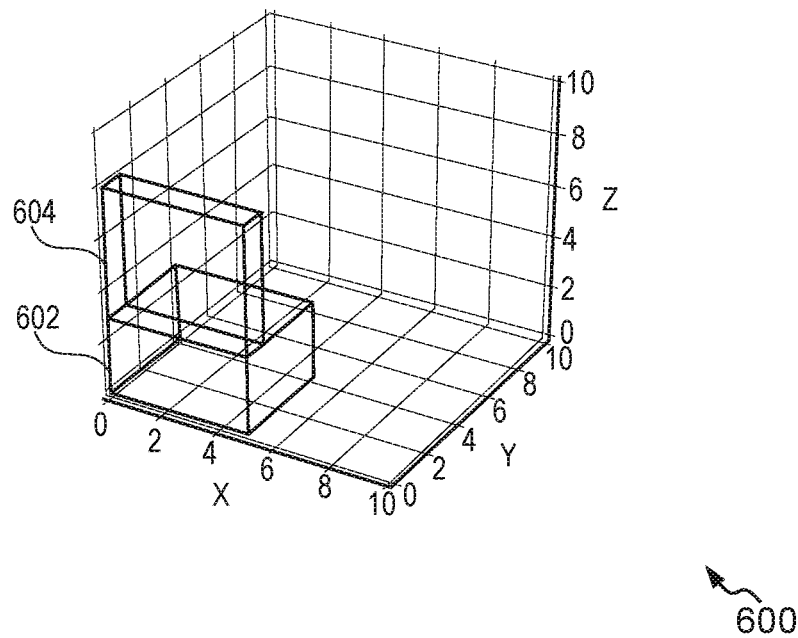
FIG. 6 shows a 3D-representation of a bin-packing layout generated by the machine learning module for facilitating placement of packages in vehicles, in accordance with an embodiment of the invention.
FIG. 7 represents an output matrix depicting co-ordinates of the placements of packages in a grid structure, in accordance with an embodiment of the invention.

FIG. 6 shows a 3D grid space based visual representation 600 of a bin-packing layout generated by the machine learning module 156 of the system 150 for facilitating placement of packages in vehicles, in accordance with an embodiment of the invention. The 3D grid space based visual representation 600 is hereinafter referred to as 3D-representation 600. It is noted that the 3D-representation 600 corresponds to a loading bin of a single delivery vehicle and similar 3D-representations of loading bins of other delivery vehicles may be generated, processed and updated in parallel during the sequential loading of packages in the vehicles.

The 3D-representation 600 includes X, Y, and Z axes upon which the placement of the packages may be shown. It is exemplarily shown in the 3D-representation 600 that a first package 602 and a second package 604 are placed in the 3D-representation 600. The co-ordinates can be marked based on the placement of the first and second packages 602 and 604 in the 3D-representation 600. As it can be seen, the first package 602 is placed at the bottom and the second package 604 is placed above it. For example, co-ordinates ((0, 0, 0), (4.5, 0, 0), (0, 5, 0), (0, 0, 2), and (4.5, 5, 2)) for each package may be generated. Similarly, the coordinates for all the packages placed on the 3D-representation 600 may be included in the bin packing layout. Similarly, all the delivery packages may be placed in a sequential manner and the 3D-representation 600 may be generated by the machine learning module 156 and sent to the load plan generation module 160.

FIG. 7 represents an output matrix depicting co-ordinates of the placements of the packages in a grid structure 702, in accordance with an embodiment of the invention. The machine learning module 156 is configured to divide the top image view of the loading bin of a delivery vehicle into a grid structure. After the grid structure is generated, the state of the loading bin after the placement of the plurality of packages is represented by filling in values in each grid. The value on each grid represents the height filled in that grid. It is exemplarily shown that 20 (5 rows and 4 columns) grids are filled with the height values. The value 8.0 is shown in the first column representing that the height filled in those grids will be 8 units on the z axis of the 3D-representation 600 shown in FIG. 6. Further, the 2nd, 3rd and 4th columns are filled with value 3.0 representing that the corresponding grids will be filled with height equal to 3 units on the Z axis of the 3D-representation 600. The values written on the edges of the output matrix define the co-ordinates of the x and y axes of the 3D-representation 600. Similarly, all the grid values associated with the placement of the plurality of package may be filled in the grid.

Referring back to FIG. 5, in at least some embodiments, the 3D representation (such as the 3D-representation 600) along with the grid structure 702 at each loading step may be provided along with the action to be taken to the load plan generation module 160. The load plan generation module 160 is configured to generate a loading plan 504, which identifies delivery packages from among the one or more delivery packages to be loaded in each vehicle from among the one or more vehicles and a sequence of loading the identified delivery packages in each vehicle. The loading plan 504 may be textual document including image graphics, such as the 3D-representation 600 and the grid structure 702, to enable a loader to follow the instructions provided in the loading plan 504 and accordingly load the plurality of packages in the selected vehicles. The loading of the packages in select vehicles as per the loading plan not only ensures 3D-fitment of all the packages within the vehicles with maximum efficiency but also ensures a minimum number of vehicles and a minimum number of consignees and drop locations that each vehicle delivers to, thereby optimizing the cost of delivering the consignment.

Figure 8:
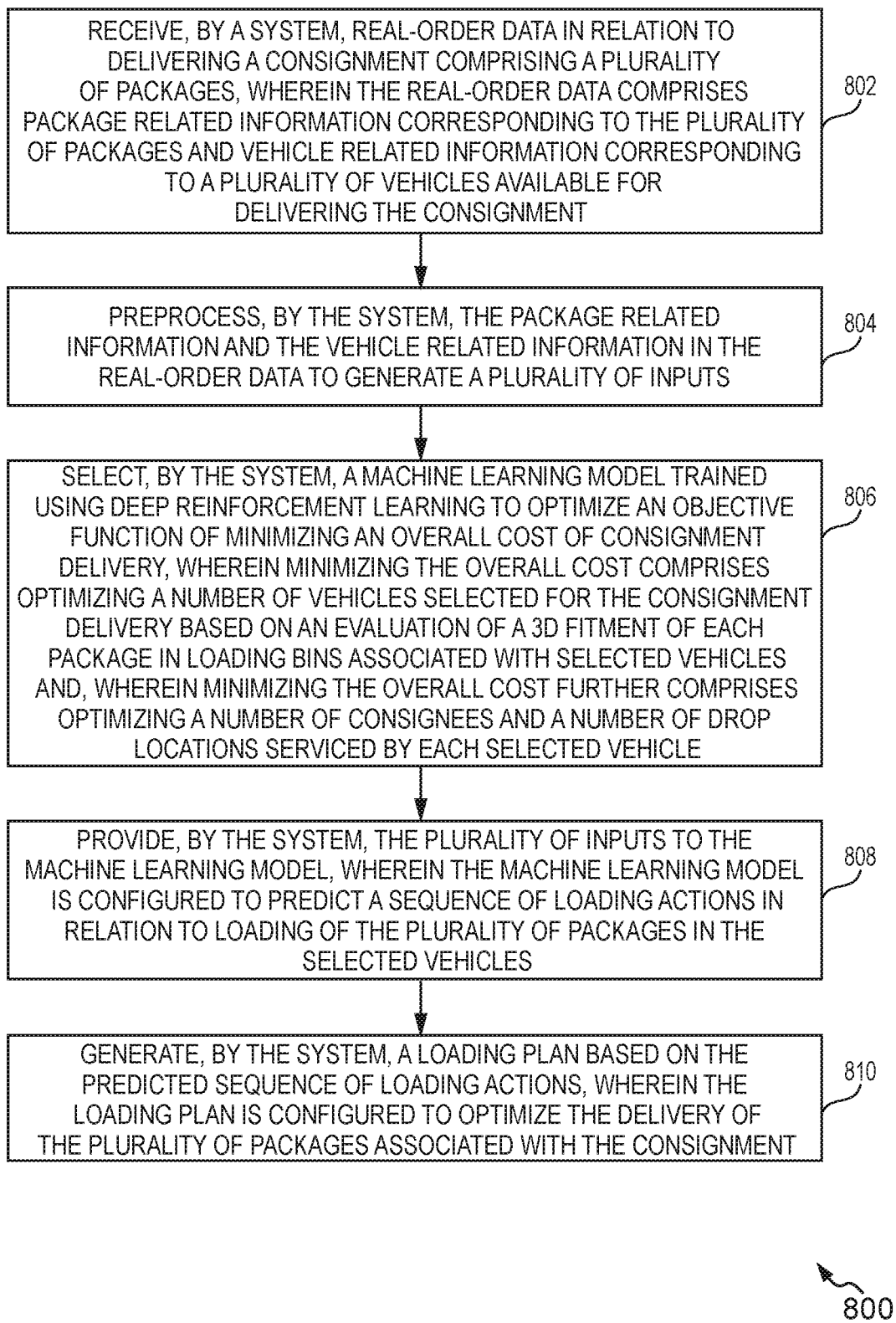
FIG. 8 shows a flow diagram of a method for optimizing delivery of consignments, in accordance with an embodiment of the invention.

FIG. 8 shows a flow diagram of a method 800 for optimizing delivery of a consignment, in accordance with an embodiment of the invention. The various steps and/or operations of the flow diagram, and combinations of steps/operations in the flow diagram, may be implemented by, for example, hardware, firmware, a processor, circuitry and/or by an apparatus such as the system 150 explained with reference to FIGS. 1 to 7 and/or by a different device associated with the execution of software that includes one or more computer program instructions. The method 800 starts at operation 802.

At operation 802 of the method 800, real-order data is received by a system such as the system 150, in relation to delivering a consignment including a plurality of packages. The plurality of packages is to be delivered from at least one pickup location to a plurality of drop locations associated with a plurality of consignees. The real-order data includes package related information corresponding to the plurality of packages and vehicle related information corresponding to a plurality of vehicles available for delivering the consignment. The package related information and the vehicle related information included within the real-order data is explained with reference to FIG. 5 and is not explained again herein.

At operation 804 of the method 800, the package related information and the vehicle related information in the real-order data are pre-processed by the system to generate a plurality of inputs. The generation of the plurality of inputs by preprocessing the package related information and the vehicle related information is explained with reference to FIGS. 3 and 5

At operation 806 of the method 800, a machine learning model trained using deep reinforcement learning (DRL) is selected by the system to optimize an objective function. The objective function may be configured based on an input provided by a user/operator of the system 150. For example, a user may provide an input indicative of the user's desire to minimize an overall cost of delivering a consignment. The system is configured to generate an objective function based on such a user input. For example, the system may define an objective function in the following manner using equation (Eqn.) (3):

$$\text{delivery\_charge} = \text{vehicle\_charge} + (\text{num\_cons} - 1) * \text{drop\_charge} \qquad \text{Eqn. (3)}$$

wherein delivery_charge is a cost of using a vehicle selected for package delivery (i.e., selected for delivering at least some packages of the consignment), vehicle_charge is a fixed charge associated with the selected vehicle, num_cons is a number of consignees that the selected vehicle will deliver to, and drop_charge is a fixed drop-off charge for each delivery at a drop location for the selected vehicle. The overall cost of delivering the consignment is derived by summing delivery charges of the selected vehicles.

Such a formulation of the objective function is configured to target minimization of the overall cost by aiming to optimize a number of vehicles required for consignment delivery by efficiently packing the loading spaces in the vehicles (i.e., solve the 3D Bin packing problem) while also optimizing a route to deliver consignment packages subject to loading and consignee/consignment constraints by minimizing the number of consignees and the drop locations (i.e., solve the CVRP problem). In effect, the objective function, which is a formulation of a CVRP problem as the 3D bin packing problem, when optimized is configured to minimize the overall cost of delivering consignments to a plurality of consignees. In at least one embodiment, the number of vehicles selected for consignment delivery is optimized based on an evaluation of a three-dimensional (3D) fitment of each package in loading bins associated with selected vehicles subject to a plurality of constraints associated with the consignment delivery.

At operation 808 of the method 800, a plurality of inputs is provided by the system to the machine learning model. The plurality of inputs is processed by the plurality of input processing layers of the machine learning model to generate a combined feature space of all valid actions as explained with reference to FIGS. 3 and 5. The combined feature space of all valid actions is provided as an input to the trained DRL-based machine learning model, which is configured to use learnt spatial and temporal correlations between state-action pairs to predict a sequence of loading actions in relation to loading of the plurality of packages in the selected vehicles. It is noted that each loading action corresponds to placement of a selected package in a selected position in a loading bin of a selected vehicle from among the selected vehicles.

At operation 810 of the method 800, a loading plan is generated by the system based on the predicted sequence of loading actions. The generation of the loading plan based on the predicted sequence of actions is explained with reference to FIGS. 5 to 7 and is not explained again herein. The loading plan is provided to a fleet management entity or to a loading personnel to perform loading of packages in the vehicles as per instructions provided in the loading plan in order to optimize the delivery of the plurality of packages associated with the consignment.

Various embodiments disclosed herein provide numerous advantages. More specifically, the embodiments disclosed herein suggest techniques for optimizing delivery of consignments to intended consignees. The NP-hard combinatorial optimization problems such as the CVRP and the bin packing problem are solved without involving heuristics, thereby enabling a user to accommodate any change in consignment delivery that may be introduced later and ensure maximum capacity utilization of the vehicles while adhering to service levels. Further, the generated loading plan maximizes capacity utilization of vehicles and minimizes the delivery cost for transferring the packages to multiple consignee locations. Such techniques significantly reduce the man-hours required for planning the freight movements across to different consignee locations. Moreover, this optimized way of shipping packages can significantly reduce the overall cost, increase customer satisfaction and drive ecologically sensitive decisions.

Although the present invention has been described with reference to specific exemplary embodiments, it is noted that various modifications and changes may be made to these embodiments without departing from the broad spirit and scope of the present invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the system 150 and its various components such as the processor 152, the memory 154, the I/O module 166, the communication module 168 and the storage module 170 may be enabled using software and/or using transistors, logic gates, and electrical circuits (for example, integrated circuit circuitry such as ASIC circuitry). Various embodiments of the present invention may include one or more computer programs stored or otherwise embodied on a computer-readable medium, wherein the computer programs are configured to cause a processor or computer to perform one or more operations (for example, operations explained herein with reference to FIG. 8). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein with reference to FIG. 8. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the present invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the present invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method (800) for optimizing delivery of consignments, the method comprising:
receiving, by a system (150), real-order data in relation to delivering a consignment comprising a plurality of packages, wherein the plurality of packages is to be delivered from at least one pickup location to a plurality of drop locations associated with a plurality of consignees and, wherein the real-order data comprises package related information corresponding to the plurality of packages and vehicle related information corresponding to a plurality of vehicles available for delivering the consignment;
preprocessing, by the system (150), the package related information and the vehicle related information in the real-order data to generate a plurality of inputs;
selecting, by the system (150), a machine learning model (164) trained using deep reinforcement learning (DRL) to optimize an objective function of minimizing an overall cost of consignment delivery, wherein minimizing the overall cost comprises optimizing a number of vehicles selected for the consignment delivery based on an evaluation of a three-dimensional (3D) fitment of each package in loading bins associated with selected vehicles subject to a plurality of constraints associated with the consignment delivery and, wherein minimizing the overall cost further comprises optimizing a number of consignees and a number of drop locations serviced by each selected vehicle;
providing, by the system (150), the plurality of inputs to the machine learning model (164) comprising a plurality of input processing layers, to generate a combined feature space of all valid loading actions, wherein the plurality of input processing layers comprises a first feed-forward neural network (FFNN) layer, a second FFNN layer, a bi-directional long short-term memory (BiLSTM) layer, a first convolutional neural network (CNN) layer, and a second CNN layer, and wherein the plurality of input processing layers performs the following operations:
generating, by the first FFNN layer, a first feature space (328) corresponding to a tensor embedding input representing information of available loading bin capacity of each selected vehicle;
generating, by the BiLSTM layer, a second feature space (330) corresponding to a tensor embedding input representing information of remaining packages to be placed after a current time stamp, the BiLSTM layer configured to capture a sequential nature of package placements in the selected vehicles;
generating, by the first CNN layer, a third feature space (332) corresponding to a tensor input representing a top view of a loading bin of each selected vehicle; and
generating, by the second CNN layer, a fourth feature space (334) corresponding to a tensor input representing a top view of a current package to be placed at the current time stamp,
wherein the machine learning model (164) is configured to predict a sequence of loading actions in relation to loading of the plurality of packages in the selected vehicles, wherein each loading action corresponds to placement of a selected package in a selected position in a loading bin of a selected vehicle from among the selected vehicles; and
generating, by the system, a loading plan based on the predicted sequence of loading actions, wherein the loading plan is configured to optimize the delivery of the plurality of packages associated with the consignment.

2. The method of claim 1, wherein the overall cost of delivering the consignment is derived by summing delivery charges of the selected vehicles and, wherein a delivery charge for a selected vehicle is defined as:

$$\text{delivery\_charge} = \text{vehicle\_charge} + (\text{num\_cons} - 1) * \text{drop\_charge}$$

wherein delivery_charge is a cost of using the selected vehicle for package delivery, vehicle_charge is a fixed charge associated with the selected vehicle, num_cons is the number of consignees that the selected vehicle will deliver to, and drop_charge is a fixed drop-off charge for each delivery at a drop location for the selected vehicle.

3. The method of claim 1, wherein the plurality of input processing layers further comprises a third FFNN layer, and a masking layer.

4. The method of claim 3,
wherein the combined feature space of all valid loading actions defines an action space of the machine learning model (164) and, wherein the machine learning model (164) is configured to predict the sequence of loading actions based, at least in part, on the action space of the machine learning model.

5. The method of claim 4, further comprising:
generating, by the second FFNN layer, a fifth feature space (336) based on a tensor embedding input corresponding to information of the current package and a concatenated output obtained by concatenating the first feature space (328), the second feature space (330), the third feature space (332) and the fourth feature space (334); and
generating, by the third FFNN layer, a combined feature space of all possible loading actions based on the fifth feature space.

6. The method of claim 5, further comprising:
applying a mask of invalid actions on the combined feature space of all possible loading actions by the masking layer to generate the combined feature space of all possible valid actions.

7. The method of claim 4, further comprising:
capturing, by the system (150), top views of the loading bins of the selected vehicles prior to performing each loading action, wherein the captured top views of the loading bins of the selected vehicles represent, at least in part, a state of the machine learning model (164) corresponding to the respective loading action and, wherein a plurality of states of the machine learning model (164) corresponding to a plurality of loading actions defines a state space of the machine learning model (164).

8. The method of claim 7, wherein each loading action in the sequence of loading actions is predicted based, at least in part, on a current state of the machine learning model (164).

9. The method of claim 7, wherein capturing the top views of the loading bins of the selected vehicles further comprises generating a three-dimensional (3D) grid space based visual representation of a top view of the loading bin of each selected vehicle, wherein the 3D grid space based visual representation is configured to visually represent packages as blocks occupying corresponding volume in a 3D grid space representing the respective loading bin.

10. The method of claim 1, further comprising:
retrieving, by the system (150), historical-order data related to at least one historical order, the historical-order data comprising freight package information and the freight vehicle information, the freight package information and freight vehicle information extracted from the historical-order data configuring a training data set;
simulating, by the system (150), a plurality of episodes iteratively, wherein each episode from among the plurality of episodes entails sequentially placing one or more freight packages into a plurality of freight vehicles to configure a particular placement sequence;
determining, by the system (150), a lowest delivery cost for the training data set based on the simulation of the plurality of episodes, wherein the lowest delivery cost is selected as a reference cost for the training data set;
calculating, by the system (150), reward values of state-action pairs associated with each episode based on a reward function, wherein each state-action pair represents a placement of a single freight package in a particular freight vehicle in response to a particular state of the machine learning model (164) and, wherein the reward function is based, at least in part, on the reference cost;
storing state, action and reward triplets associated with each episode by the system (150); and
sampling, by the system (150), the state, action and reward triplets to configure parameters of the machine learning model (164), wherein the configuration of the parameters is configured to fine tune spatial and temporal correlations between states and actions to enable training of the machine learning model (164).

11. A system (150) for optimizing delivery of consignments, the system (150) comprising:
a memory (154) for storing instructions; and
a processor (152) configured to execute the instructions and thereby cause the system (150) to at least:
receive real-order data in relation to delivering a consignment comprising a plurality of packages, wherein the plurality of packages is to be delivered from at least one pickup location to a plurality of drop locations associated with a plurality of consignees and, wherein the real-order data comprises package related information corresponding to the plurality of packages and vehicle related information corresponding to a plurality of vehicles available for delivering the consignment,
pre-process the package related information and the vehicle related information in the real-order data to generate a plurality of inputs,
select a machine learning model (164) trained using deep reinforcement learning (DRL) to optimize an objective function of minimizing an overall cost of consignment delivery, wherein minimizing the overall cost comprises optimizing a number of vehicles selected for the consignment delivery based on an evaluation of a three-dimensional (3D) fitment of each package in loading bins associated with selected vehicles subject to a plurality of constraints associated with the consignment delivery and, wherein minimizing the overall cost further comprises optimizing a number of consignees and a number of drop locations serviced by each selected vehicle,
provide the plurality of inputs to the machine learning model (164) comprising a plurality of input processing layers, to generate a combined feature space of all valid loading actions, wherein the plurality of input processing layers comprises a first feed-forward neural network (FFNN) layer, a second FFNN layer, a bi-directional long short-term memory (BiLSTM) layer, a first convolutional neural network (CNN) layer, and a second CNN layer, and wherein the plurality of input processing layers performs the following operations:
generate, by the first FFNN layer, a first feature space (328) corresponding to a tensor embedding input representing information of available loading bin capacity of each selected vehicle;
generate, by the BiLSTM layer, a second feature space (330) corresponding to a tensor embedding input representing information of remaining packages to be placed after a current time stamp, the BiLSTM layer configured to capture a sequential nature of package placements in the selected vehicles;
generate, by the first CNN layer, a third feature space (332) corresponding to a tensor input representing a top view of a loading bin of each selected vehicle; and
generate, by the second CNN layer, a fourth feature space (334) corresponding to a tensor input representing a top view of a current package to be placed at the current time stamp,
wherein the machine learning model (164) is configured to predict a sequence of loading actions in relation to loading of the plurality of packages in the selected vehicles, wherein each loading action corresponds to placement of a selected package in a selected position in a loading bin of a selected vehicle from among the selected vehicles, and
generate a loading plan based on the predicted sequence of loading actions, wherein the loading plan is configured to optimize the delivery of the plurality of packages associated with the consignment.

12. The system of claim 11, wherein the overall cost of delivering the consignment is derived by summing delivery charges of the selected vehicles and, wherein a delivery charge for a selected vehicle is defined as:

delivery_charge=vehicle_charge+(num_cons−1)
 *drop_charge wherein delivery_charge is a cost of using the selected vehicle for package delivery, vehicle_charge is a fixed charge associated with the selected vehicle, num_cons is the number of consignees that the selected vehicle will deliver to, and drop_charge is a fixed drop-off charge for each delivery at a drop location for the selected vehicle.

13. The system of claim 11, wherein the plurality of input processing layers comprises a third FFNN layer, and a masking layer.

14. The system of claim 13, wherein the machine learning model (164) is configured to predict the sequence of loading actions based, at least in part, on the action space of the machine learning model (164).

15. The system of claim 14, wherein the system is further caused to:
   generate, by the second FFNN layer, a fifth feature space (336) based on a tensor embedding input corresponding to information of the current package and a concatenated output obtained by concatenating the first feature space (328), the second feature space (330), the third feature space (328) the second feature space (334);
   generate, by the third FFNN layer, a combined feature space of all possible loading actions based on the fifth feature space; and
   apply a mask of invalid actions on the combined feature space of all possible loading actions by the masking layer to generate the combined feature space of all possible valid actions.

16. The system of claim 14, wherein the system is further caused to:
   capture top views of loading bins of the selected vehicles prior to performing each loading action, wherein the captured top views of the loading bins of the selected vehicles represent, at least in part, a state of the machine learning model (164) corresponding to the respective loading action and, wherein a plurality of states of the machine learning model (164) corresponding to a plurality of loading actions defines a state space of the machine learning model (164).

17. The system of claim 16, wherein capturing the top views of the loading bins of the selected vehicles further comprises generating a three-dimensional (3D) grid space based visual representation of a top view of the loading bin of each selected vehicle, wherein the 3D grid space based visual representation is configured to visually represent packages as blocks occupying corresponding volume in a 3D grid space representing the respective loading bin.

18. The system of claim 11, wherein the system is further caused to:
   retrieve historical-order data related to at least one historical order, the historical-order data comprising freight package information and freight vehicle information, the freight package information and the freight vehicle information extracted from the historical-order data configuring a training data set;
   simulate a plurality of episodes iteratively, wherein each episode from among the plurality of episodes entails sequentially placing one or more freight packages into a plurality of freight vehicles to configure a particular placement sequence;
   determine a lowest delivery cost for the training data set based on the simulation of the plurality of episodes, wherein the lowest delivery cost is selected as a reference cost for the training data set;
   calculate reward values of state-action pairs associated with each episode based on a reward function, wherein each state-action pair represents a placement of a single freight package in a particular freight vehicle in response to a particular state of the machine learning model (164) and, wherein the reward function is based, at least in part, on the reference cost;
   store state, action and reward triplets associated with each episode; and
   sample the state, action and reward triplets to configure parameters of the machine learning model (164), wherein the configuration of the parameters is configured to fine tune spatial and temporal correlations between states and actions to enable training of the machine learning model (164).

19. A computer-implemented method for optimizing delivery of consignments, the method comprising:
   receiving, by a system (150), real-order data in relation to delivering a consignment comprising a plurality of packages, wherein the plurality of packages is to be delivered from at least one pickup location to a plurality of drop locations associated with a plurality of consignees and, wherein the real-order data comprises package related information corresponding to the plurality of packages and vehicle related information corresponding to a plurality of vehicles available for delivering the consignment;
   preprocessing, by the system (150), the package related information and the vehicle related information in the real-order data to generate a plurality of inputs;
   selecting, by the system (150), a machine learning model (164) trained to use deep reinforcement learning (DRL) for optimizing packing of the plurality of packages in an optimum number of vehicles selected from among the plurality of vehicles, the packing of the plurality of packages in the selected vehicles performed subject to a plurality of constraints and subject to optimizing a number of consignees and a number of drop locations serviced by each selected vehicle;
   providing, by the system (150), the plurality of inputs to the machine learning model (164) comprising a plurality of input processing layers, to generate a combined feature space of all valid loading actions, wherein the plurality of input processing layers comprises a first feed-forward neural network (FFNN) layer, a second FFNN layer, a bi-directional long short-term memory (BiLSTM) layer, a first convolutional neural network (CNN) layer, and a second CNN layer, and wherein the plurality of input processing layers performs the following operations:
      generating, by the first FFNN layer, a first feature space (328) corresponding to a tensor embedding input representing information of available loading bin capacity of each selected vehicle;
      generating, by the BiLSTM layer, a second feature space (330) corresponding to a tensor embedding input representing information of remaining packages to be placed after a current time stamp, the BiLSTM layer configured to capture a sequential nature of package placements in the selected vehicles;

generating, by the first CNN layer, a third feature space (332) corresponding to a tensor input representing a top view of a loading bin of each selected vehicle; and generating, by the second CNN layer, a fourth feature space (334) corresponding to a tensor input representing a top view of a current package to be placed at the current time stamp, wherein the machine learning model (164) is configured to predict a sequence of loading actions in relation to loading of the plurality of packages in the selected vehicles, wherein each loading action corresponds to placement of a selected package in a selected position in a loading bin of a selected vehicle from among the selected vehicles; and generating, by the system (150), a loading plan based on the predicted sequence of loading actions, wherein the loading plan is configured to optimize the delivery of the plurality of packages associated with the consignment.

\* \* \* \* \*